United States Patent
Wetzel et al.

(10) Patent No.: US 11,229,253 B2
(45) Date of Patent: Jan. 25, 2022

(54) RATE-ACTIVATED HELMET SUSPENSION

(71) Applicant: U.S. Army Research Laboratory ATTN: RDRL-LOC-I, Adelphi, MD (US)

(72) Inventors: Eric D. Wetzel, Bel Air, MD (US); Devon J. Spinelli, Smithtown, NY (US); Thomas A. J. Plaisted, Forest Hill, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 16/295,101

(22) Filed: Mar. 7, 2019

(65) Prior Publication Data
US 2020/0022443 A1    Jan. 23, 2020

Related U.S. Application Data

(60) Provisional application No. 62/641,784, filed on Mar. 12, 2018.

(51) Int. Cl.
*A42B 3/14* (2006.01)
*A42B 3/12* (2006.01)
(Continued)

(52) U.S. Cl.
CPC .............. *A42B 3/06* (2013.01); *A42B 3/121* (2013.01); *A42B 3/125* (2013.01); *A42B 3/14* (2013.01); *A63B 71/10* (2013.01); *F16F 13/08* (2013.01)

(58) Field of Classification Search
CPC ........... A42B 3/14; A42B 3/142; A42B 3/147; A42B 3/06; A42B 3/125; A42B 3/121;
(Continued)

(56) References Cited

U.S. PATENT DOCUMENTS 2,879,513 A * 3/1959 Hornickel ................ A42B 3/14
                                                       2/414
3,089,144 A * 5/1963 Cherup .................... A42B 3/14
                                                       2/414
(Continued)

OTHER PUBLICATIONS

Devon J.Spinelli, Thomas A.Plaisted, and Eric D.Wetzel, "Adaptive head impact protection via a rate-activated helmet suspension," Materials and Design 154 (2018) 153-169 (Sep. 15, 2018; available online May 4, 2018).

*Primary Examiner* — Amy Vanatta
(74) *Attorney, Agent, or Firm* — Eric B. Compton

(57) ABSTRACT

Impact energy absorbing devices, in some embodiments, may be configured as a helmet having suspension elements employing "rate activated tethers" (RATs), a speed-sensitive flexible strapping material. The RATs are configured to suspend a helmet shell on the head of a wearer, so that impact to the helmet causes extension of the RATs. The RATs provide for: (1) steady force over long strokes, and (2) a stroke force that increases with increasing impact velocity. Standard impact testing of a helmeted headform shows that the RAT suspension decreases head accelerations by 50% relative to a standard suspension system. This decrease in head acceleration is expected to lead to a reduced likelihood of brain and head injury. Because the RATs absorb energy during tensile extension, they offer increases in energy absorption efficiency. These RAT suspensions can potentially replace or complement existing helmet pad and suspension systems in military, sports, and industrial safety-wear.

23 Claims, 35 Drawing Sheets

(51) Int. Cl.
*A42B 3/06* (2006.01)
*F16F 13/08* (2006.01)
*A63B 71/10* (2006.01)

(58) Field of Classification Search
CPC ........... A42B 3/064; A42B 7/10; A42B 71/08;
A42B 71/12; A42B 71/1225–71/141;
A42B 3/0473; A42B 3/0486; F16F 15/04;
F16F 9/103; F16F 13/08; F16F 13/002;
F16F 13/06; F16F 13/04; F16F 7/00;
A41D 13/00; A41D 13/0002; A41D
13/0007; A41D 13/0015; A41D 13/015;
A41D 13/05–13/088; A62B 35/00
See application file for complete search history.

(56) References Cited

U.S. PATENT DOCUMENTS

| | | | |
|---|---|---|---|
| 5,712,011 A * | 1/1998 | McMahon | A41F 1/00 2/338 |
| 6,467,099 B2 * | 10/2002 | Dennis | A42B 3/12 2/455 |
| 8,578,520 B2 | 11/2013 | Halldin | |
| 9,303,717 B2 | 4/2016 | Wetzel et al. | |
| 9,750,297 B1 * | 9/2017 | Mini Townson | A42B 3/046 |
| 9,958,023 B2 | 5/2018 | Wetzel et al. | |
| 10,178,888 B2 | 1/2019 | Wetzel et al. | |
| 2009/0064396 A1 * | 3/2009 | Ghajar | A42B 3/0473 2/411 |
| 2009/0158509 A1 * | 6/2009 | Ghajar | A42B 3/046 2/422 |
| 2011/0277225 A1 * | 11/2011 | Salkind | A41D 13/0512 2/461 |
| 2011/0302700 A1 * | 12/2011 | Vito | A42B 3/14 2/412 |
| 2013/0283507 A1 * | 10/2013 | Baty | A42B 3/064 2/416 |
| 2014/0015176 A1 * | 1/2014 | Wetzel | F16F 13/002 267/69 |
| 2018/0092422 A1 * | 4/2018 | Knight | A41D 13/015 |
| 2018/0311064 A1 | 11/2018 | Wetzel et al. | |
| 2019/0054363 A1 * | 2/2019 | Metts | A42B 3/121 |
| 2020/0015538 A1 * | 1/2020 | Bar-Cohen | A42B 3/06 |

* cited by examiner

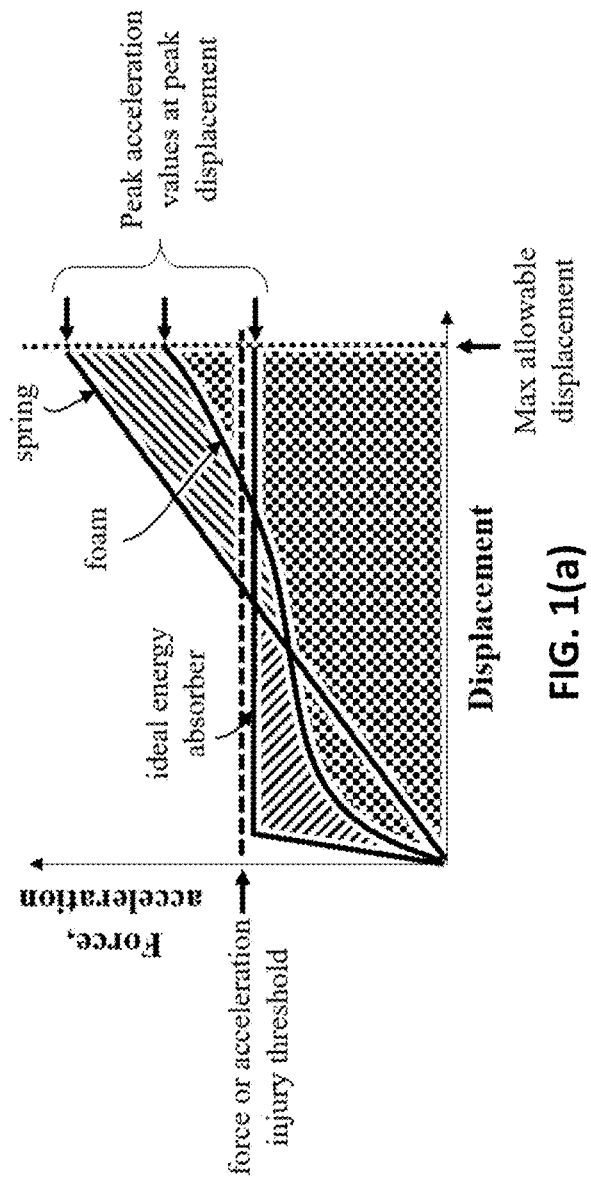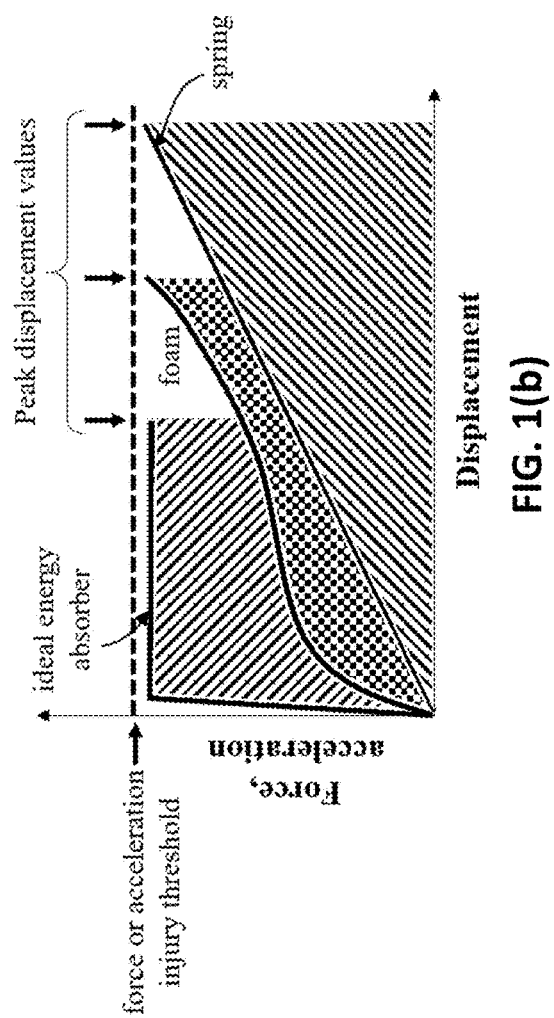
FIG. 1(a)
FIG. 1(b)

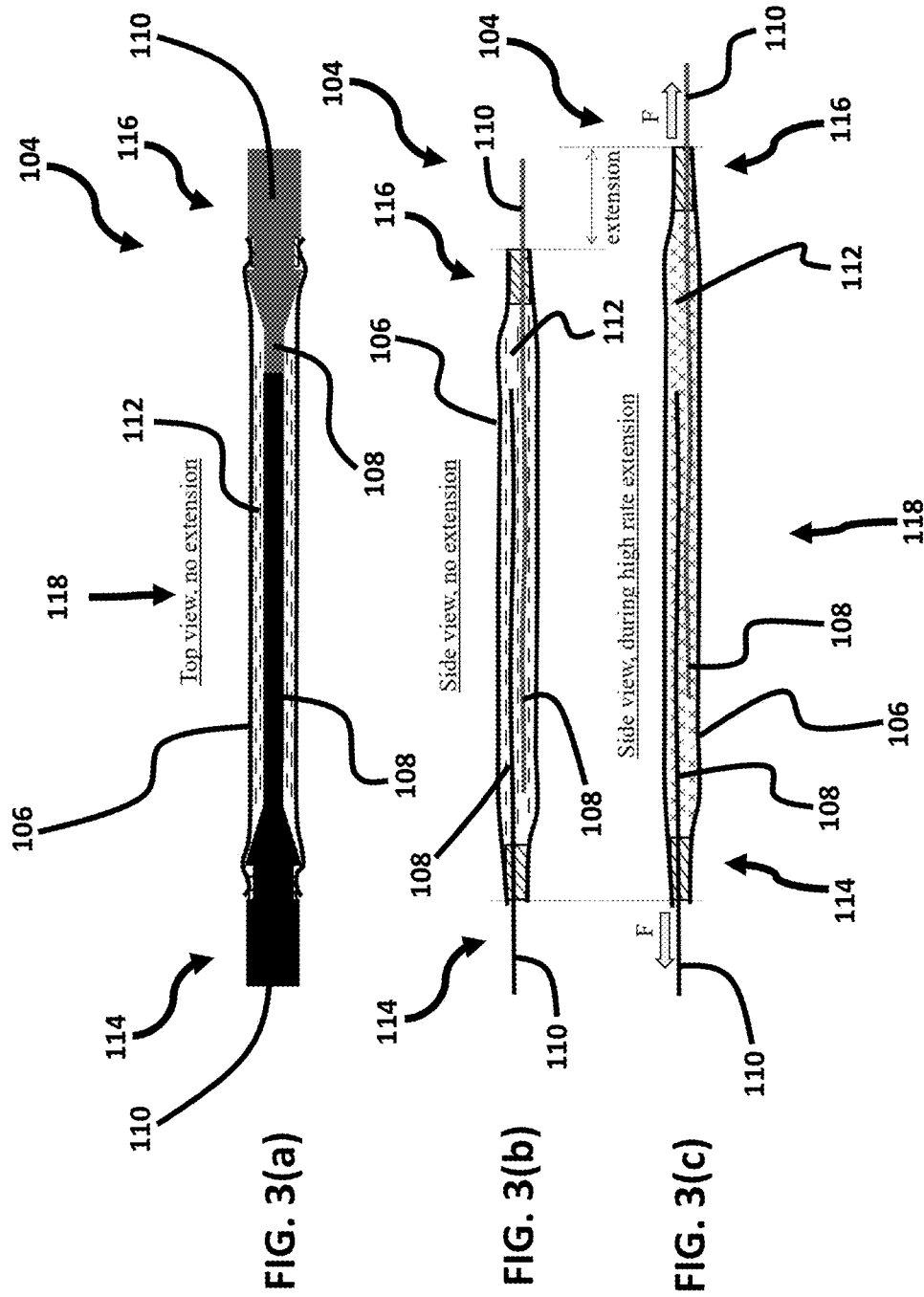

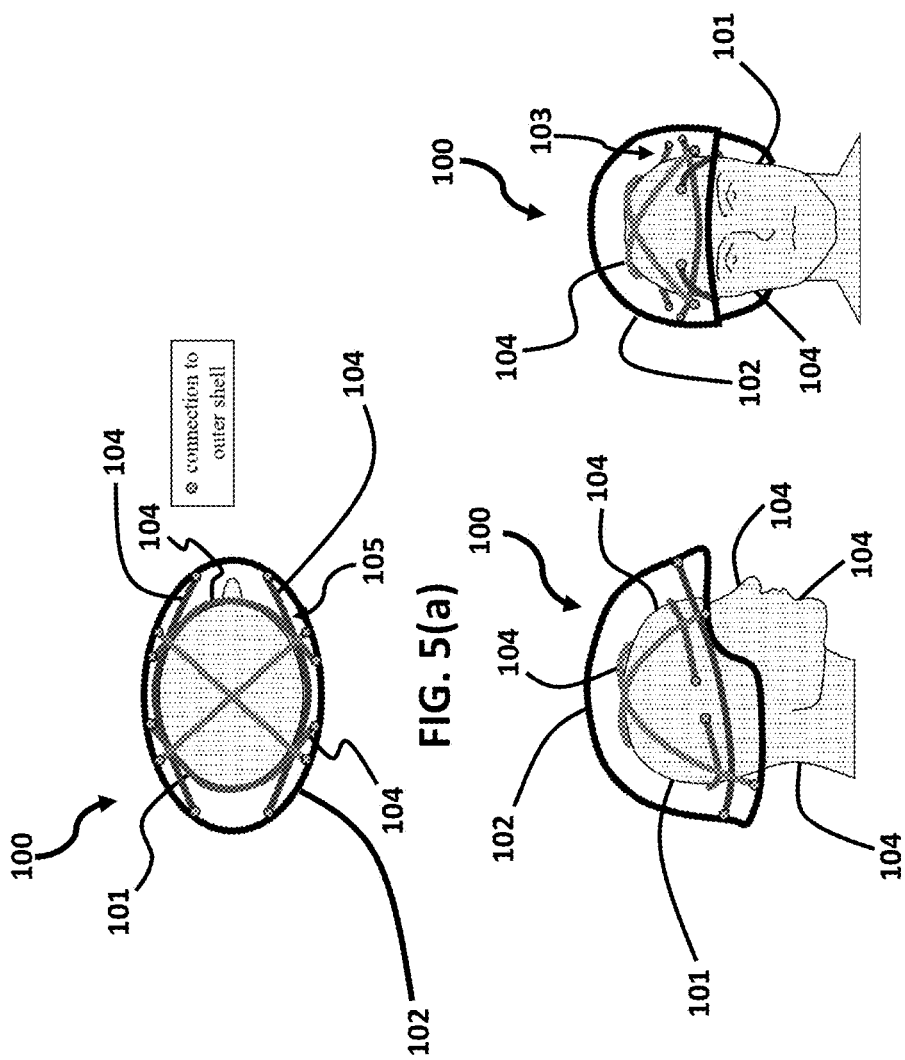

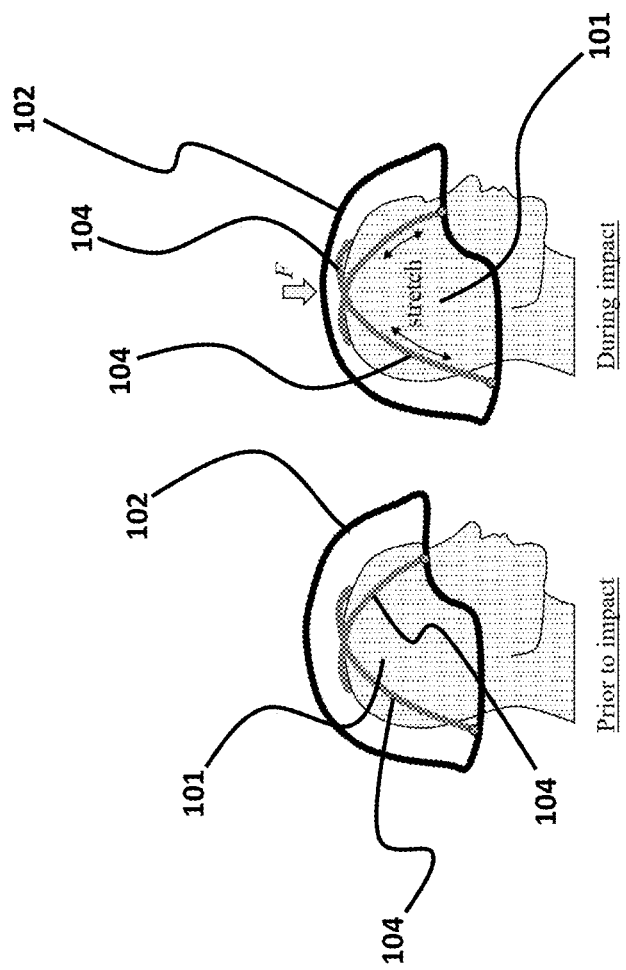
FIG. 6(a) Prior to impact
FIG. 6(b) During impact

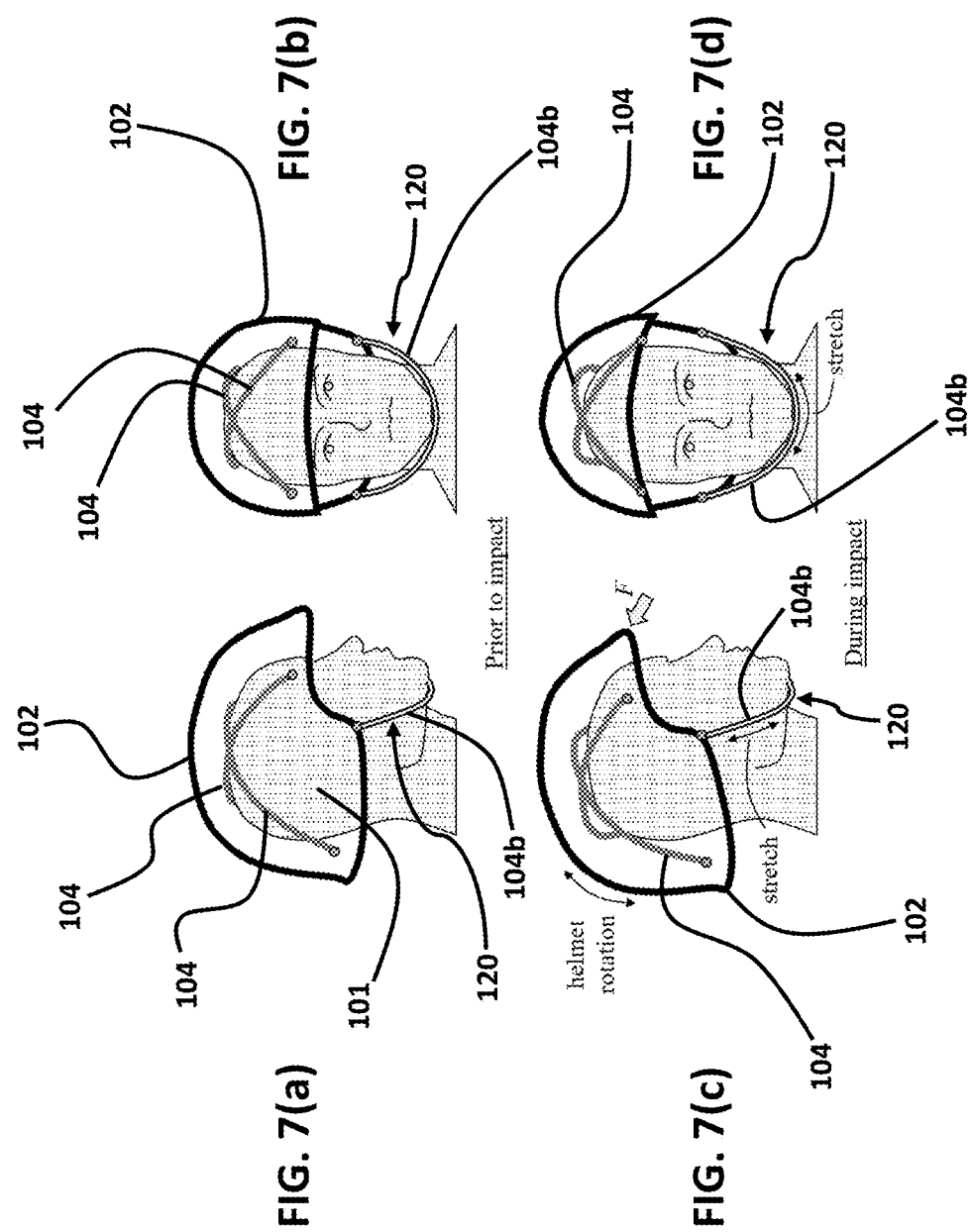

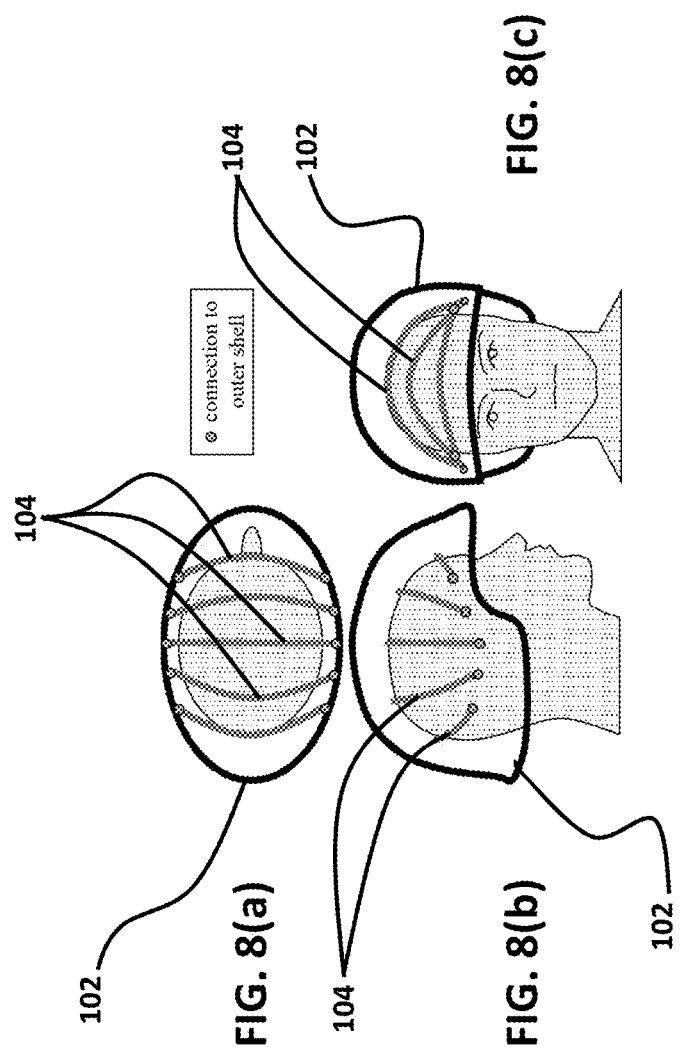

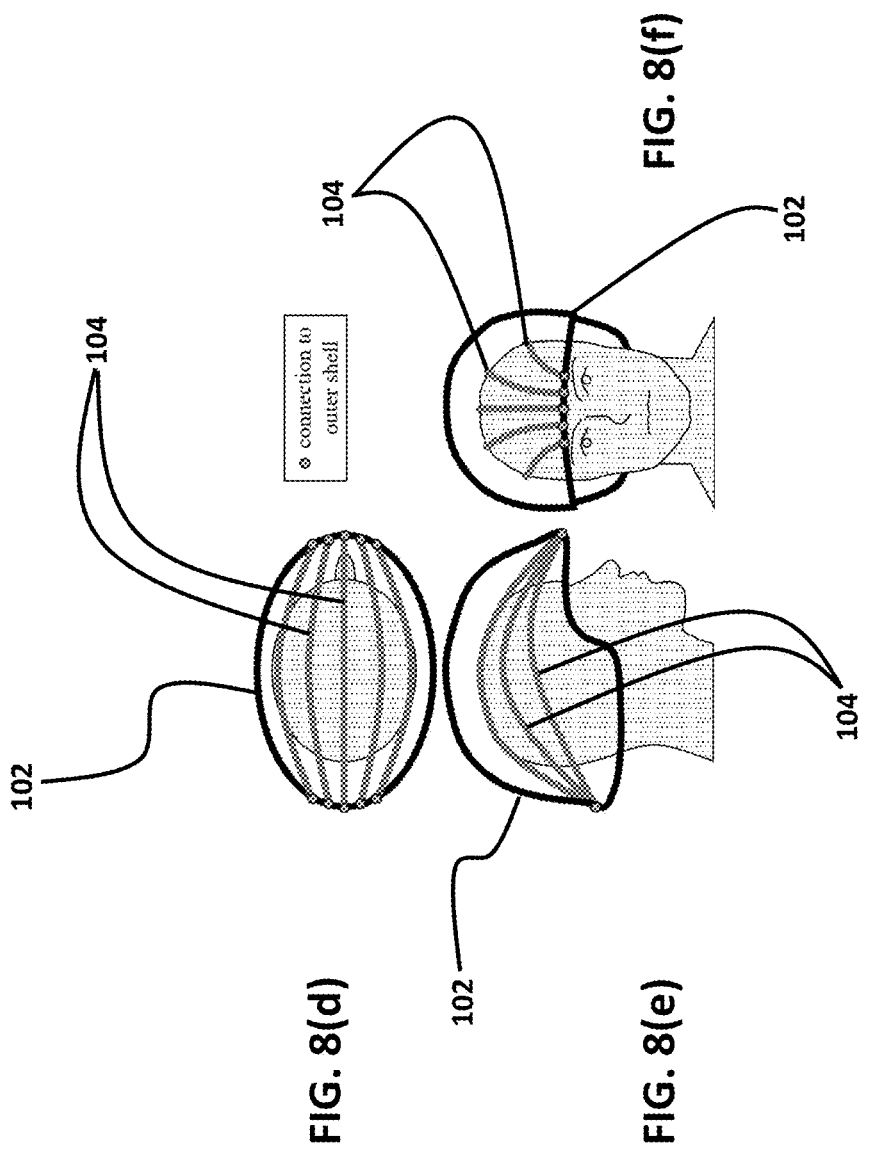

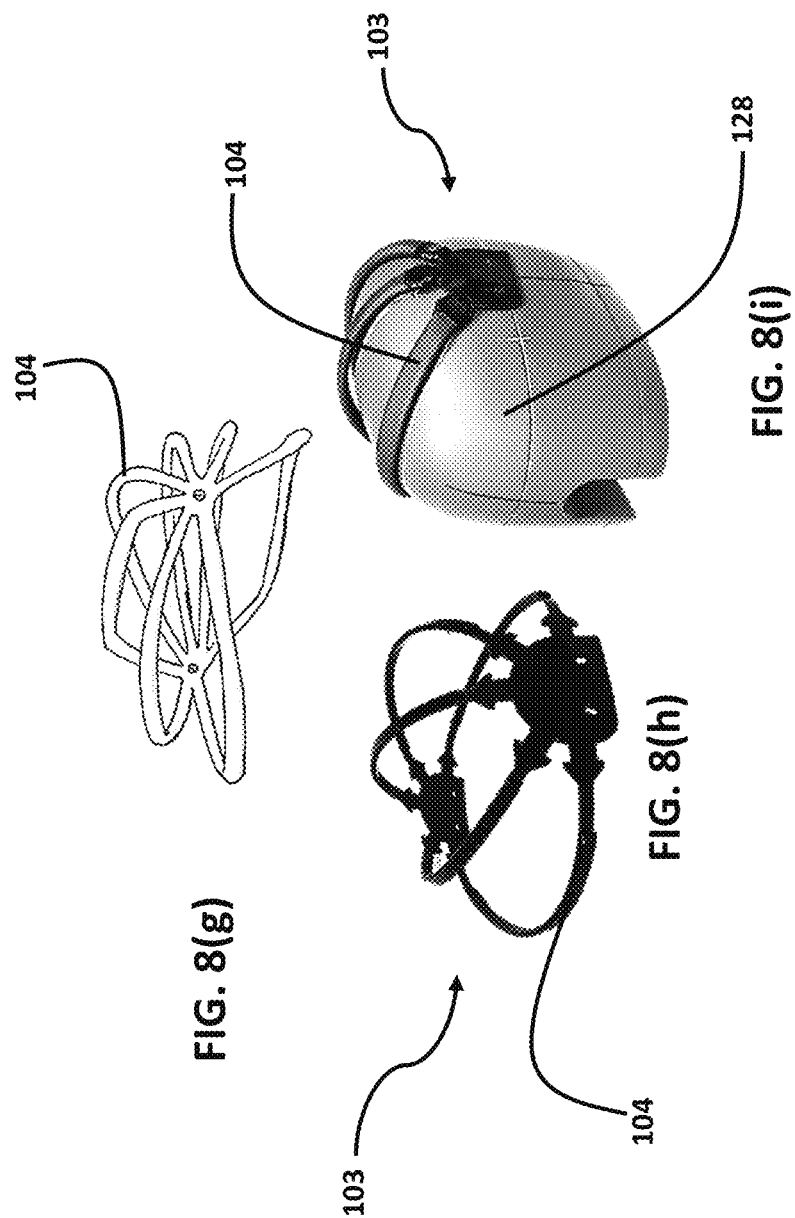

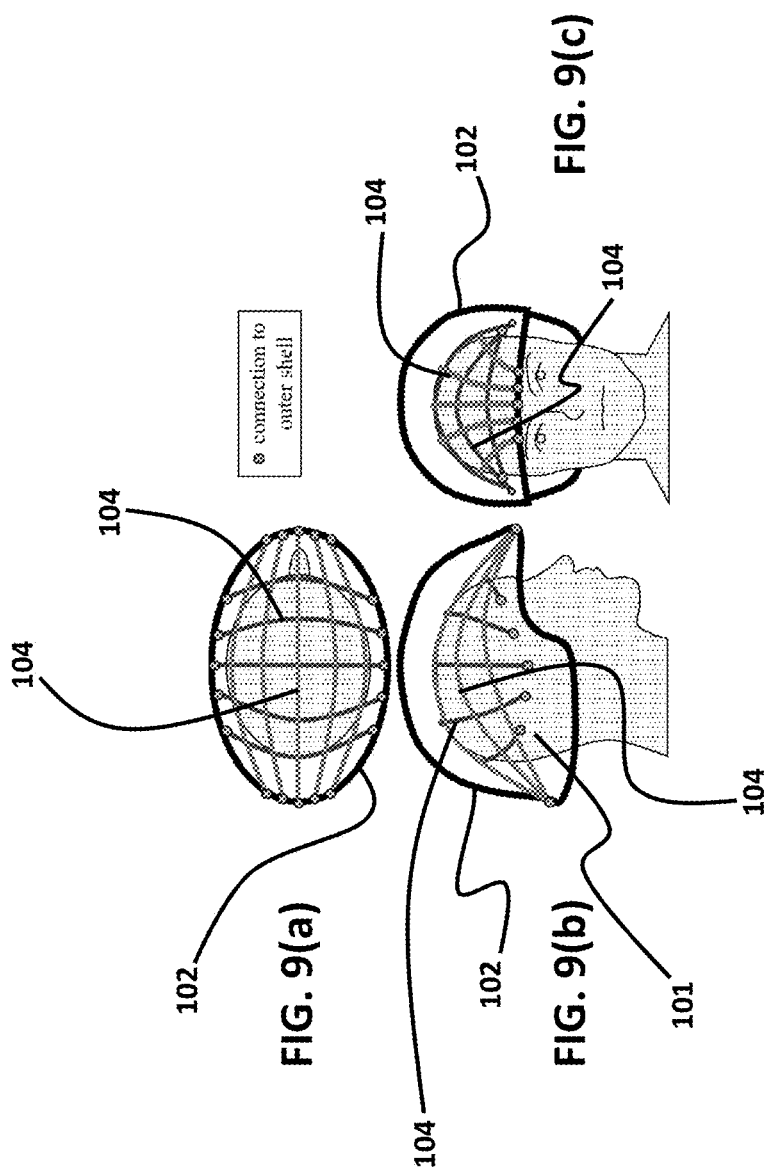

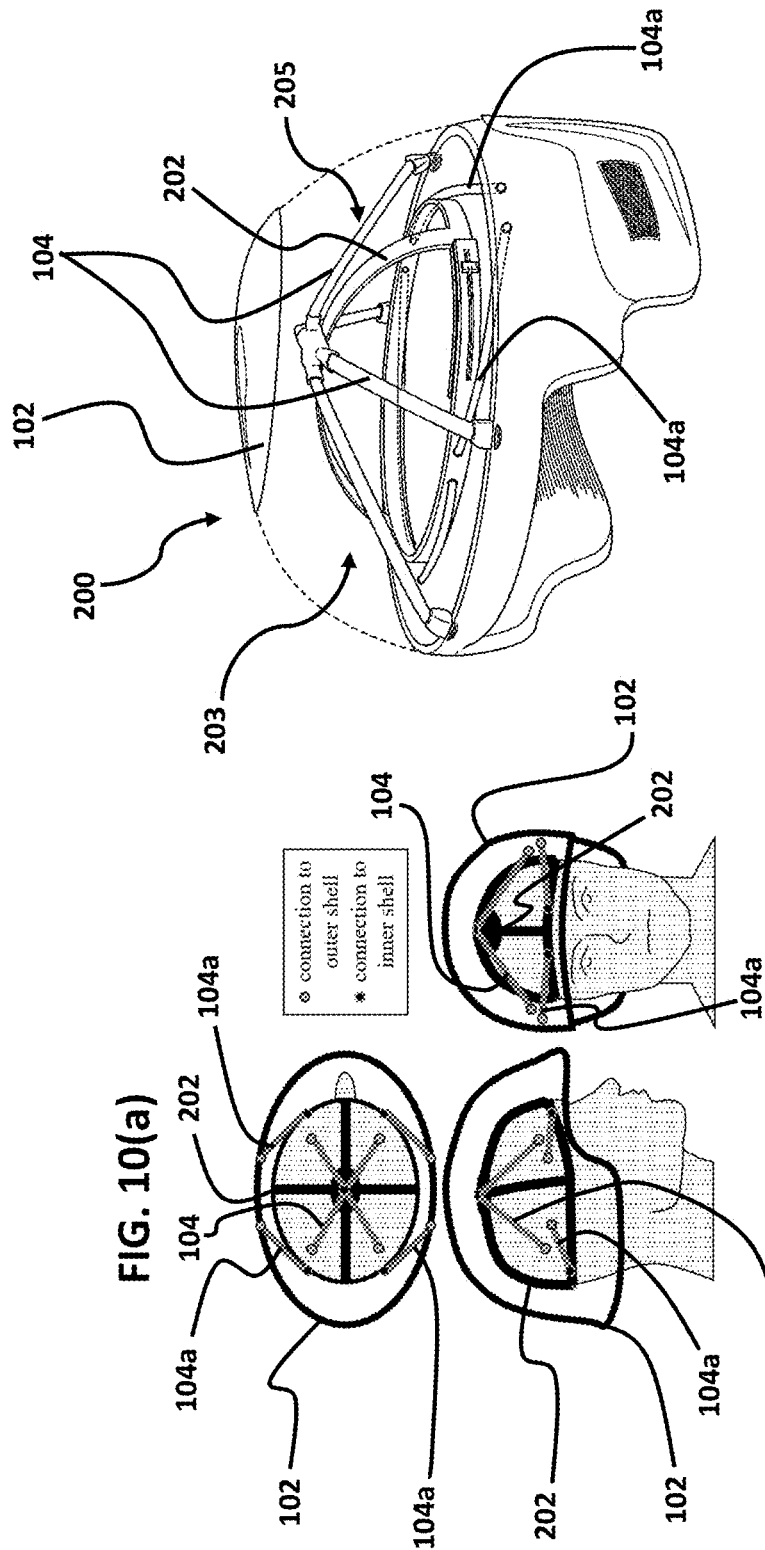

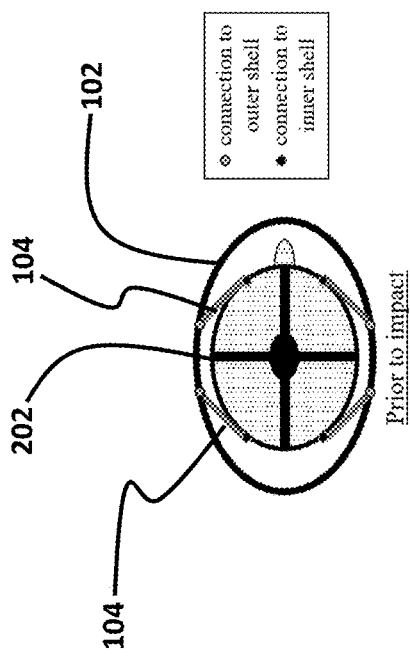
FIG. 11(a) Prior to impact
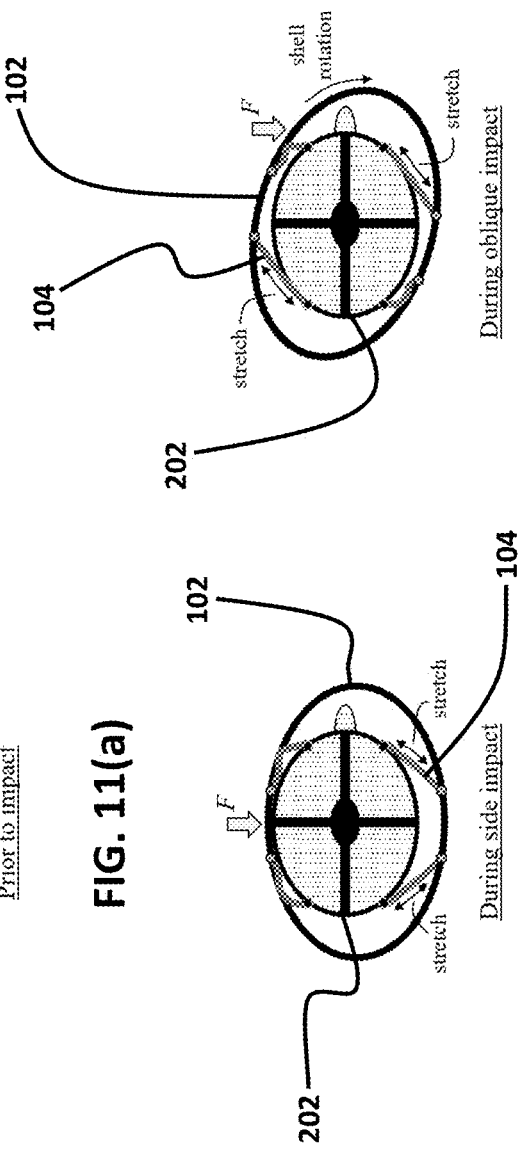
FIG. 11(b) During side impact
FIG. 11(c) During oblique impact

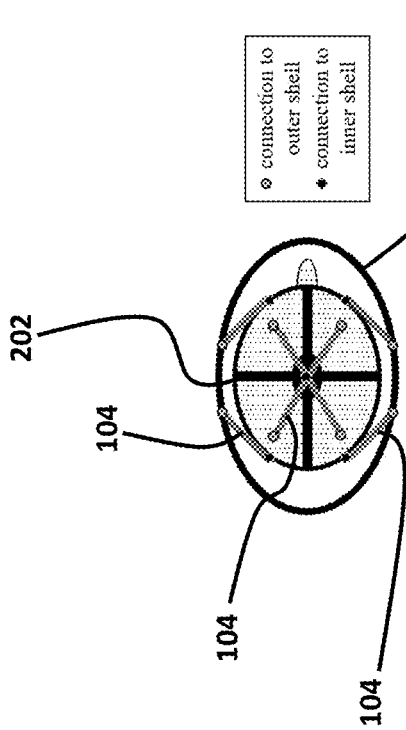
FIG. 13(a)
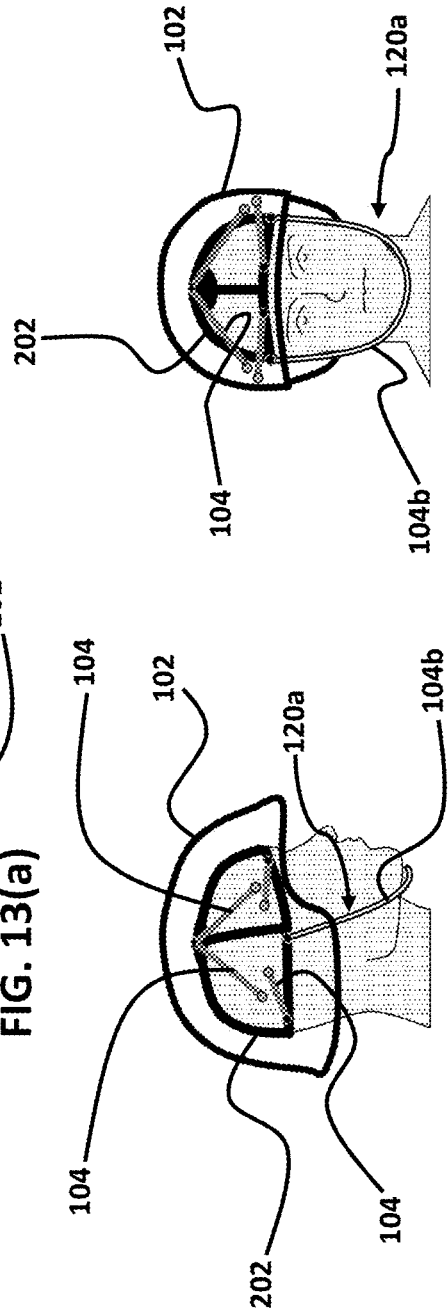
FIG. 13(b)
FIG. 13(c)

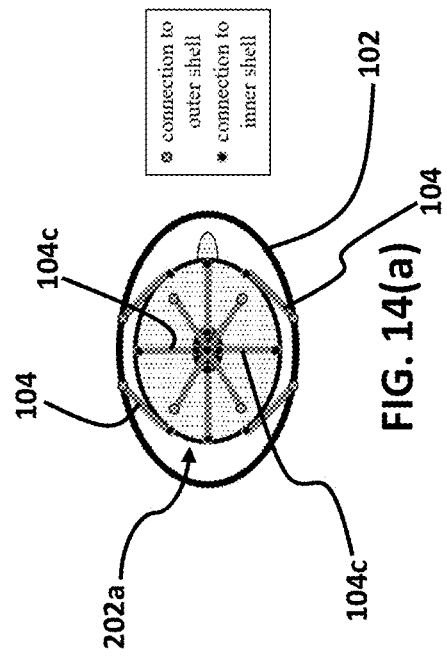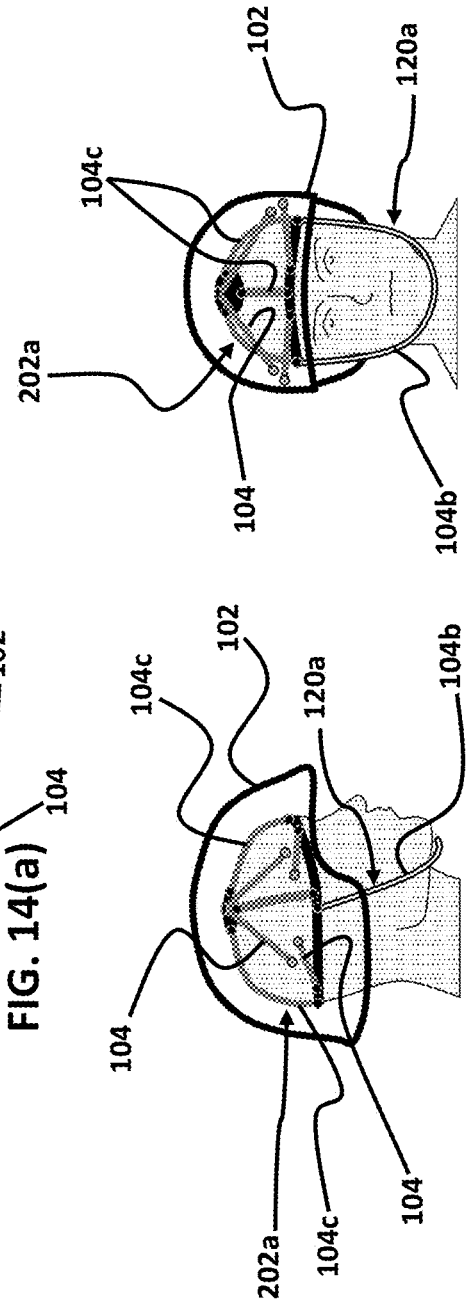

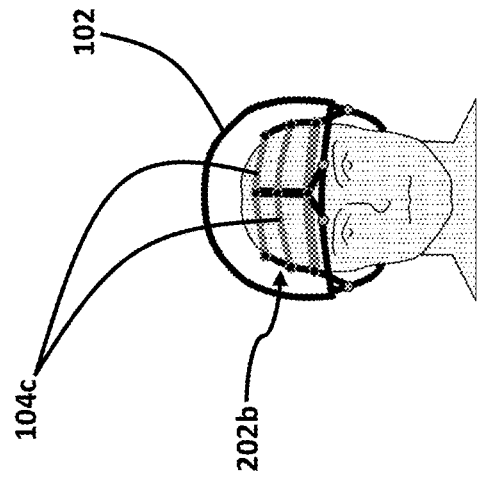
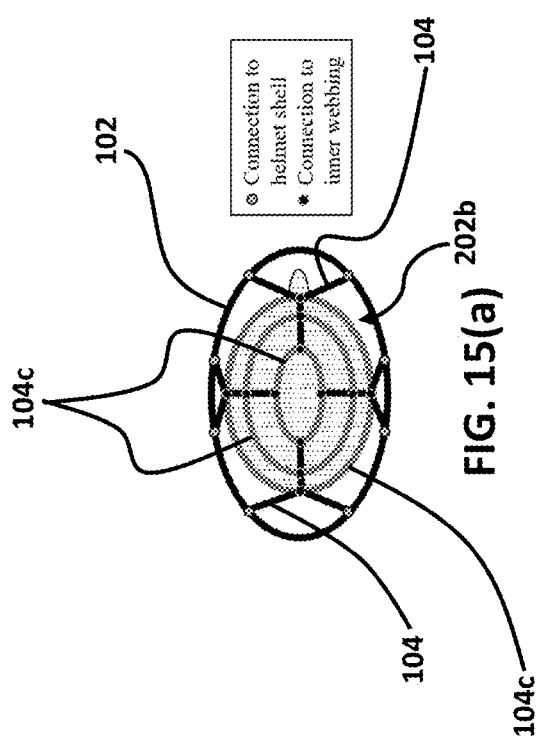
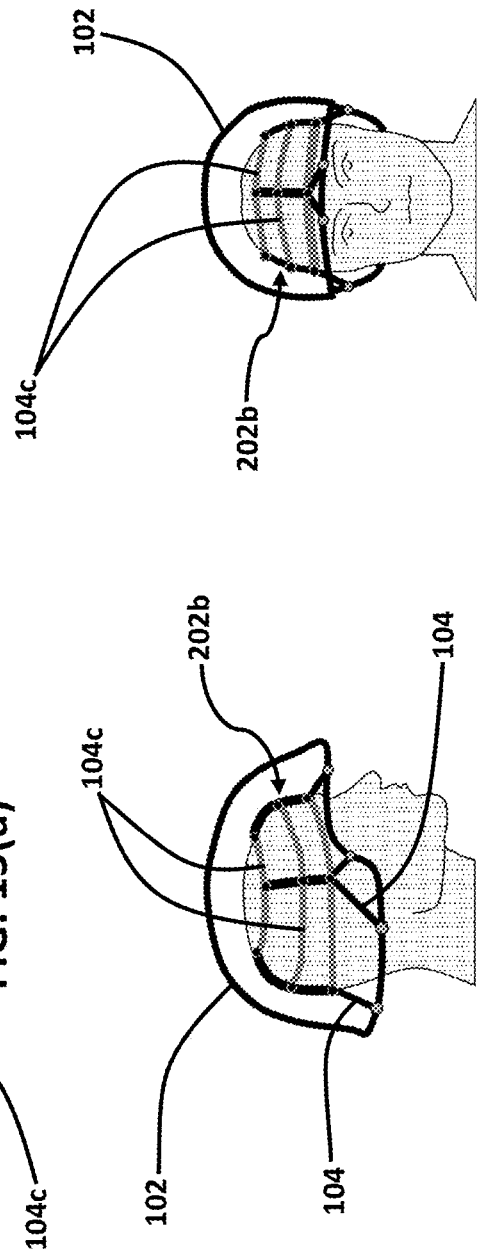
FIG. 15(a)
FIG. 15(b)
FIG. 15(c)

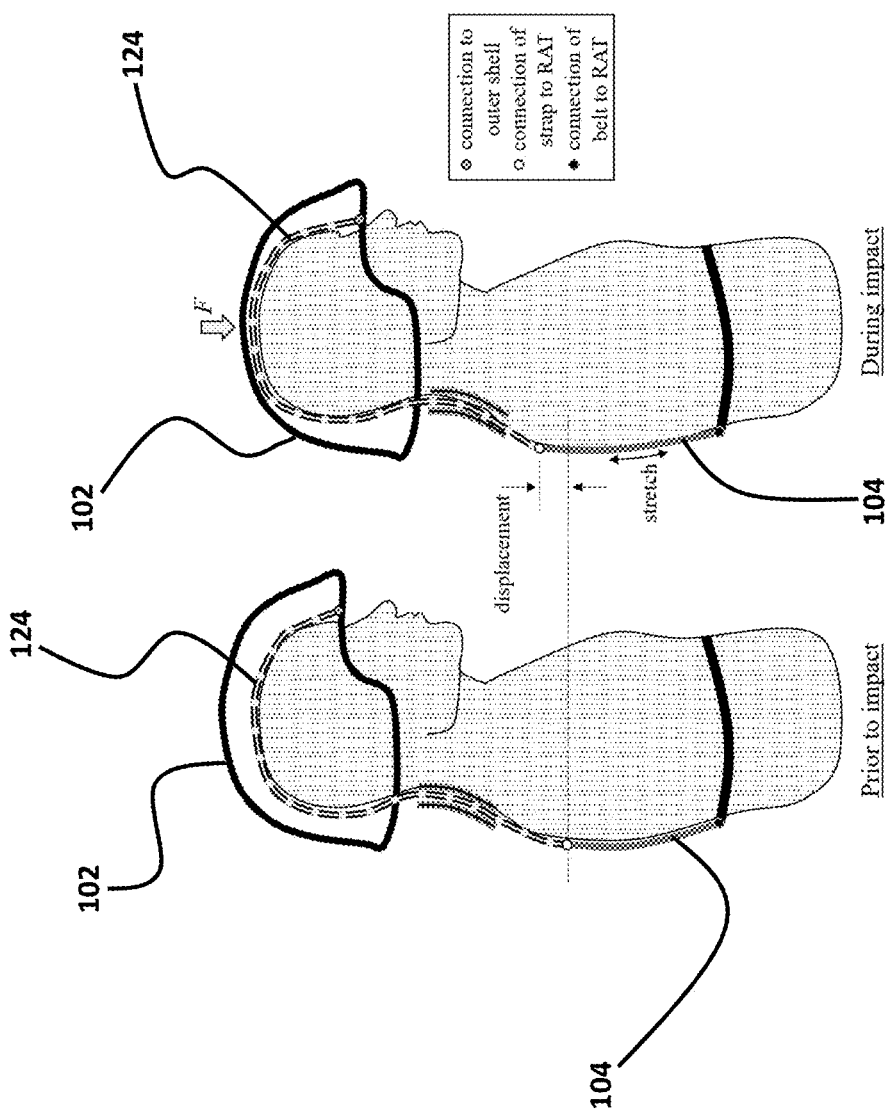
FIG. 19(a) Prior to impact
FIG. 19(b) During impact

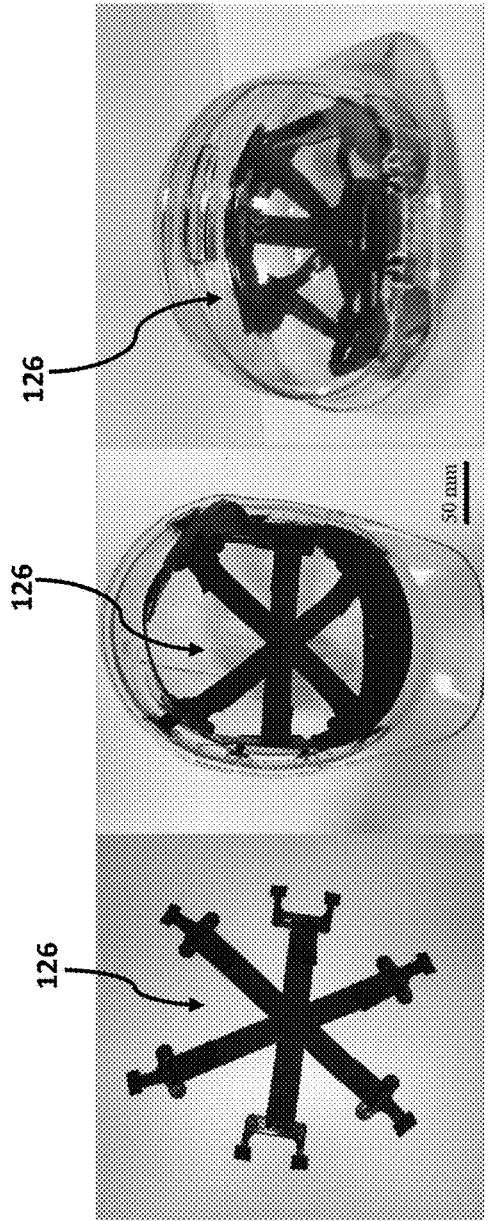
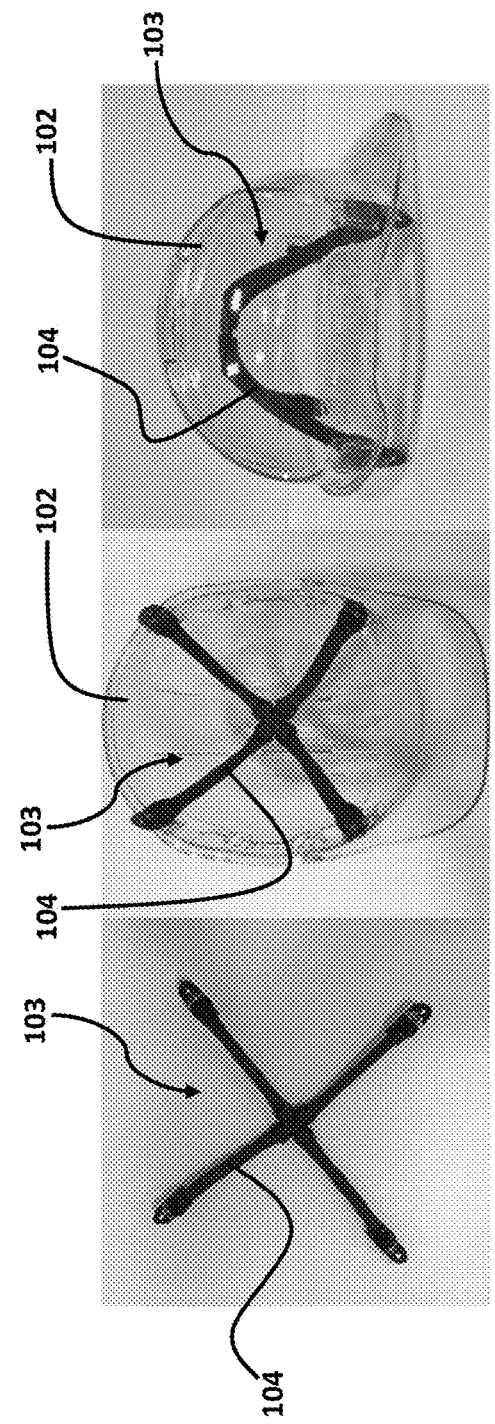
FIG. 20(a) FIG. 20(b) FIG. 20(c)
FIG. 20(d) FIG. 20(e) FIG. 20(f)

RATE-ACTIVATED HELMET SUSPENSION

CROSS-REFERENCE TO RELATED APPLICATION(S)

This application claims the benefit of U.S. Provisional Patent Application No. 62/641,784 filed on Mar. 12, 2018, which is incorporated herein by reference in its entirety.

GOVERNMENT INTEREST

The embodiments herein may be manufactured, used, and/or licensed by or for the United States Government without the payment of royalties thereon.

BACKGROUND

Technical Field

The embodiments herein generally relate to suspension systems for protecting an object from the effects of impact forces and acceleration due to impacts, particularly for protecting the head of a person against impacts and sudden accelerations.

Description of the Related Art

Head accelerations due to impact cause head and brain injuries. At very high energies, these accelerations can lead to skull fracture. At lower energies, these accelerations can cause concussion. Recent studies suggest that, even at very low energies, repetitive accelerative events can cause neurological degeneration with serious long-term health effects. Safety devices that reduce the magnitude and duration of head accelerations are, therefore, likely to reduce the likelihood of head and brain injuries.

Helmets are the most common safety-wear used to reduce the likelihood of head and brain injuries. Most helmets are principally designed to prevent skull fracture, which has a high morbidity rate. More recently, with the recognition of the serious health effects associated with brain injury, helmets have also been studied and improved for the purposes of preventing brain injuries.

There is a critical need for improved low velocity impact protection provided by military helmets. Current pad technologies allow military helmets to meet minimum threshold requirements (10 fps head impact), but no current technology allows for protection against higher Army objective requirements (14 and 17 fps head impacts) under the same geometric limitations. Given the heightened concern with traumatic brain injury (TBI) in the Army and broader society, a technology with the potential to significantly improve head protection is critically important.

Sports helmets, including football, hockey, lacrosse, and motorsports helmets, and industrial safety-wear, including hard hats and firefighter helmets, would all benefit from improvements in the level of impact protection provided by such devices.

SUMMARY

In view of the foregoing, the embodiments herein provide impact energy absorbing devices that reduce the forces imparted to objects or bodies that are to be protected from impacts. In various embodiments, the device may be configured as a helmet having suspension elements comprising one or more "rate activated tethers" (RATs), a speed-sensitive flexible strapping material. In such embodiments, the RATs are configured to suspend a helmet shell on the head of a wearer, so that impact to the helmet causes extension of the RATs. The RATs provide two key features that are ideal for an energy absorber: (1) steady force over long strokes, and (2) a stroke force that increases with increasing impact velocity. Standard impact testing of a helmeted headform shows that the RAT suspension decreases head accelerations by 50% relative to a standard suspension system. This decrease in head acceleration is expected to lead to a reduced likelihood of brain and head injury. Because the RATs absorb energy during tensile extension, they offer design and integration opportunities that are very different from traditional foam compression pads, and can lead to further increases in energy absorption efficiency. These RAT suspensions can potentially replace or complement existing helmet pad and suspension systems in military, sports, and industrial safety-wear.

The embodiment disclosed herein provide an energy absorber for a helmet, in which the energy absorption elements are RATs. The RATs are configured so that, during impact to the helmet, the RATs are stretched along their length. This extension generates a resistance force that decelerates the impacting body while absorbing energy. Because of the ideal constant force behavior of RATs, this decelerative process for the present invention is more efficient than conventional helmet energy absorbers, resulting in lower peak accelerations at similar peak displacements. Furthermore, because of the speed sensitivity of RATs, peak accelerations are kept near ideally minimal values over a wide range of impact conditions. The present invention includes multiple concepts for configuring RATs to absorb energy from helmet impacts for multiple directions. The RATs can also be used to couple an "inner" helmet shell, that fits close to the head, and an "outer" helmet shell, to provide improved fit and multi-directional protection from translational and rotational impulses. In addition, because RATs absorb energy in tension, the present embodiments include concepts for transmitting loads inside the helmet to RATs located outside of the helmet shell, via flexible tensile elements such as cables, straps, and ribbons. This concept for remote energy absorption has the potential to further increase helmet performance by allowing maximum stroke for the head relative to the helmet shell.

Some embodiments herein provide a helmet having RATs that are connected at both ends to the outer or helmet shell and an intermediate portion of the RATs bears against the head of a wearer to support the helmet shell over the wearer's head at a distance from the head of the wearer.

In some other embodiments, an inner shell is included that closely fits the wearer's head. The RATs are attached between the inner shell and the outer helmet shell to support the outer shell over the inner shell and the wearer's head at a distance from the inner shell and in turn from the head of the wearer. The terms "helmet shell," "outer shell," and "helmet outer shell" are used interchangeably herein.

In yet other embodiments, the RATs are used as energy absorbers in a vehicular seat to mitigate the effects of impacts on the occupant of the seat. In yet further embodiments, the RATs are used as energy absorbers to protect critical components in projectiles from the shocks and impacts of launch and landing. The critical components may be electronic.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications. Any permutations of the various aspects of the embodiments as listed above are considered to be within the scope of the embodiments disclosed herein and the embodiments disclosed herein include all such permutations. The words "engaging," "bearing against," "mounted," "supported," and "attached," including all their various other forms and synonyms, as used herein are intended to encompass both direct and indirect forms of engaging, bearing against, mounting, supporting, and attaching, respectively, except as may otherwise be specified for specific instances of such words.

BRIEF DESCRIPTION OF THE DRAWINGS

The embodiments herein will be better understood from the following detailed description with reference to the drawings, in which:

FIGS. 1(a) and 1(b) illustrate graphs comparing the behavior of an ideal energy absorber for injury mitigation, with an elastic spring and a foam under compression.

FIGS. 3(a)-3(c) are schematic diagrams of an embodiment of a rate activated tether (RAT) for use in the disclosed embodiments.

FIGS. 5(a)-5(c) are schematic diagrams of an example of a RAT helmet suspension for resistance to impact from multiple directions.

FIGS. 6(a)-6(b) are a fragmentary schematic view showing the RAT helmet suspension response to a crown impact.

FIGS. 7(a)-7(d) are schematic views of a design that combines the RAT helmet suspension with a RAT retention strap.

FIGS. 8(a)-8(c) show an alternative configuration for RAT suspension, in which RATs are located in planes rotated about a horizontal anatomical axis through the approximate center of the head.

FIGS. 8(d)-8(f) show an alternative configuration for RAT suspension, in which RATs are located in planes rotated about a sagittal anatomic axis through the approximate center of the head.

FIGS. 8(g)-8(i) show a prototypes and sketch of a RAT suspensions similar to that of FIGS. 8(a)-8(c).

FIGS. 9(a)-9(c) are fragmentary schematic views showing an alternative configuration for a RAT suspension, in which RATs are located in multiple planes to create a "net" of RATs.

FIGS. 10(a)-10(d) show a suspension design in which RATs are used to connect an inner shell to an outer shell.

FIGS. 11(a)-11(c) are schematic views showing the RAT suspension between an inner shell and an outer shell, subject to impacts that induce translational or rotational motion.

FIGS. 13(a)-13(c) are schematic views showing a suspension design in which RATs are used to connect an inner shell to an outer shell and RATs are used as a retention strap.

FIGS. 14(a)-14(c) are schematic views showing a suspension design in which RATs are used to connect an inner shell to an outer shell, RATs are used as a retention strap, and the inner shell contains some RAT elements.

FIGS. 15(a)-15(c) are schematic views showing a suspension design in which individual RATs are arranged as circumferential bands within an inner shell.

FIGS. 19(a)-19(b) are schematic views showing a suspension design in which RATs are placed remotely from the head, for example mounted to the torso of the wearer.

FIGS. 20(a)-20(f) are photographs of a hardhat with a conventional strap suspension system ((a)-(c)), and a hardhat with a RAT suspension system prototype ((d)-(f)).

DETAILED DESCRIPTION

Figure 2:
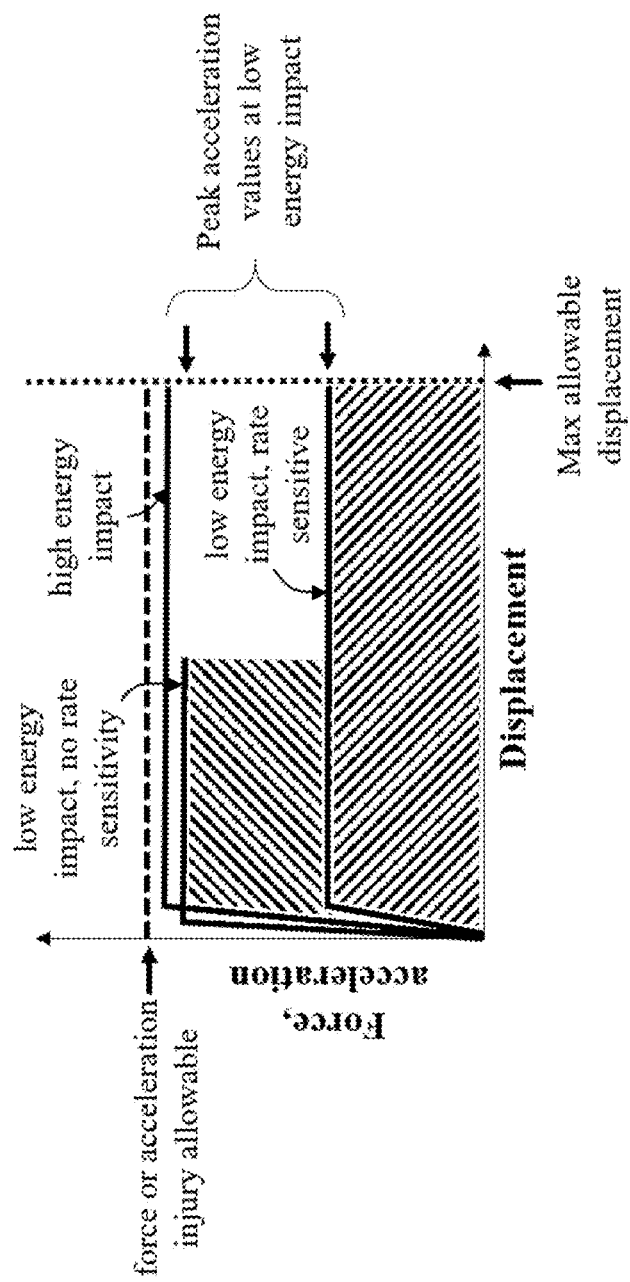
FIG. 2 is a graph illustrating the importance of rate sensitivity for achieving ideal energy absorption.

The embodiments herein and the various features and advantageous details thereof are explained more fully with reference to the non-limiting embodiments that are illustrated in the accompanying drawings and detailed in the following description. Descriptions of well-known components are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments disclosed herein generally relate to impact energy absorbing devices comprising a surface which receives an impact force and is in proximity to a body;

and one or more rate activated tethers (RATs) in contact with said surface, the one or more RATs configured to absorb impact energy and reduce the force transmitted to the body.

Some of the embodiments disclosed herein relate to a helmet suspension system that provides highly efficient, speed sensitive energy absorption for minimizing head accelerations during helmet impact.

Referring to FIGS. 1(a) through 25(b), some of the embodiments disclosed herein relate to impact energy absorbing devices comprising a surface which receives an impact force and is in proximity to a body; and a suspension system connected to the surface for suspending the body and the surface relative to each other in at least one predetermined direction, wherein the suspension system comprises strapping connected to the surface, wherein the strapping is positioned at least in part in a space between the body and the surface during use, wherein the suspension system acts between the body and the surface during use, and the strapping comprises at least one rate activated tether (RAT) 104, wherein the suspension system is configured to absorb impact energy and reduce the force transmitted to the body.

Exemplary embodiments herein may be configured as a helmet, a vehicular seat, or a projectile. The embodiments disclosed herein have applications for helmet impact protection for military, sports, and industrial helmets. RATs also generally have good applicability for energy absorption and impact mitigation applications.

The presently disclosed embodiments provide an adaptive helmet suspension system. The suspension elements used in the illustrated embodiments consist of "rate activated tethers" (RATs), a speed-sensitive flexible strapping material disclosed in U.S. Pat. No. 9,303,717, issued to Eric D. Wetzel et al., on Apr. 5, 2016, which is incorporated by reference herein in its entirety. In the embodiments herein, RATs are configured to suspend a helmet shell on the head of a wearer, so that impact to the helmet causes extension of the RATs. The RATs provide two key features that are ideal for an energy absorber: (1) steady force over long strokes, and (2) a stroke force that increases with increasing impact velocity.

Webbed and compression pad (e.g. foam) helmet suspensions have changed little in their design and performance over the past 20 years. The embodiments disclosed herein consist of a webbed suspension in which the webbing material is an engineered, "smart" material that is optimized for impact energy absorption. Because the RATs absorb energy during tensile extension, they offer design and integration opportunities that are very different from traditional foam compression pads, and can lead to further increases in energy absorption efficiency.

The embodiments herein provide greater reduction in head acceleration due to helmet impact, compared to conventional webbed and foam suspension systems. The disclosed embodiments tend to reduce head accelerations during head impact, in order to reduce the likelihood of head and brain injury. Standard impact testing of a helmeted headform shows that the RAT suspension decreases head accelerations by 50% relative to a standard suspension system. This decrease in head acceleration is expected to lead to a reduced likelihood of brain and head injury.

FIGS. 1(a)-1(b) show a comparison of ideal energy absorber for injury mitigation, with an elastic spring and a foam under compression. Force and acceleration values are those experienced by a headform wearing a helmet subject to impact, and utilizing the ideal energy absorber, foam, or spring between the helmet shell and headform. FIG. 1(a) shows an equal energy absorption comparison for equal maximum displacement, showing spring and foam peak force and acceleration higher than the peak value for the ideal energy absorber. FIG. 1(b) shows equal energy absorption curves for equal maximum force and acceleration, showing spring and foam requiring greater peak displacements relative to the ideal energy absorber.

While the physics of head and brain trauma are complex, one important injury metric is maximum head acceleration during the impact event. To minimize the likelihood of all forms of head and brain injury, therefore, peak head acceleration should be minimized. To achieve this goal, the energy absorbing component of the helmet should have two key performance features. First, the energy absorber should create a steady resistance force during its stroke (FIGS. 1(a) and 1(b)). This steady resistance force, when normalized by the mass of the headform, generates a steady acceleration in the headform. Given a set of impact conditions, the ideal energy absorber can be designed so that the headform experiences a steady acceleration just below the injury threshold. For the case of a fixed maximum allowable displacement, this ideal energy absorber can absorb the maximum amount of impact energy within that displacement limit, where energy absorbed is the area under the force-displacement curve (FIG. 1(a), "ideal energy absorber" curve). In comparison, an energy absorber in which force is proportional to displacement, such as a linear spring or other elastic element, will impart twice as much peak acceleration to absorb the same amount of energy at the same displacement limit (FIG. 1(a), "spring" curve). For a typical foam compression pad, an early force plateau is followed by rapid densification and increasing force (FIG. 1(a), "foam" curve). While a variety of force response curve shapes are possible depending on the details of foam pad design, the curvature of the loading curve will lead to peak acceleration values that are higher than the ideal energy absorber under identical impact conditions. Based on these principles, it is critical for an ideal energy absorber to exhibit steady force over a long stroke during impact.

FIG. 1(b) compares the same energy absorbers, but considers designs that all achieve the same peak acceleration value below the injury threshold. Under conditions of identical impact energy, the areas under the force-displacement curves must be equal. Therefore, the ideal energy absorber will require less displacement to absorb the same amount of energy, compared to the linear spring and compressive foam pad energy absorbers. The ability to minimize displacement is critical for applications such as helmets, where stroke is limited by the distance provided by the gap between the head and helmet shell.

A second critical feature for an ideal energy absorber is increasing resistance force with increasing impact energy. FIG. 2 illustrates the importance of rate sensitivity for achieving ideal energy absorption. The first curve shows ideal energy absorber response under high energy impact. Under low energy impact, the first and second curves show two contrasting behaviors. The second curve shows no rate sensitivity, so peak force at low energy is identical to peak force at high energy of the first curve. This behavior does not minimize peak forces at all impact energies. The third curve represents a rate sensitive energy absorber, in which peak displacement at low energy is consistent with peak displacement at high energy of the first curve, resulting in a peak force that reduces as impact energy is decreased.

FIG. 2 shows three energy absorption curves that all meet a basic injury allowable. The first curve shows an ideal energy absorber under high energy impact, where the maximum displacement is reached while forces stay below the injury threshold. The second curve shows the behavior of an energy absorber that exhibits steady force behavior, impacted at lower energy. This energy absorber does not have rate sensitivity, so that the acceleration experienced by the headform is identical at low and high energies. At lower energies, therefore, the peak displacement of the second energy absorber is significantly below the maximum allowable displacement. In contrast, the third curve shows an energy absorber that exhibits resistance force that is steady with increasing displacement, but the resistance force is proportional to impact energy. Said differently, the third energy absorber is more compliant at lower energies, and more resilient at higher energies. The third energy absorber is designed so that the full displacement allowable is used at all impact energies which, critically, minimizes peak acceleration at all impact energies.

This rate sensitive behavior is critically important for an optimal helmet energy absorber. Although both the first and second energy absorbers meet the injury allowable, the third energy absorber minimizes the acceleration experienced by the wearer under all impact conditions. For example, a helmet might be designed to prevent skull fracture and severe concussion, leading to the selection of a relatively stiff helmet pad. However, under low energy impacts that are significantly more common than severe impacts, the head will still experience high accelerations just below the injury threshold. Over time, many of these repetitive low energy impacts could increase the likelihood of brain injury. In contrast, a rate-sensitive energy absorber would be "softer" at low impact energies, minimizing head accelerations, while still providing a "stiffer" response at high impact energies to prevent severe concussions.

This combination of properties—steady force over a long stroke, and a force that increases with increasing impact energy—are not commonly found together in a single energy absorber technology such as a foam or spring. However, a new energy absorber technology, "rate activated tethers" (RATs), exhibits these properties and, therefore, is ideally suited for helmet applications. RATs have previously been described in detail in U.S. Pat. No. 9,303,717 B2, and U.S. patent application Ser. No. 15/057,944 (now U.S. Pat. No. 9,958,023 B2, issued to Wetzel et al. on May 1, 2018), all of which are incorporated by reference herein in their entireties, but will be briefly summarized here.

Referring to FIGS. 3(a)-3(c), RATs 104 may comprise: (i) an elastic-deformable confinement member 106, typically an elastomeric tube, (ii) a pair of filaments 108 placed inside the confinement member, where the filaments can be for example cables or ribbons, (iii) barbed end effectors 110 which couple one end of each filament 108 to opposite ends of the tube 106, and (iv) a shear-thickening fluid (STF) 112 that fills the tubing 106, surrounding and wetting the filaments 108. The STF 112 has the unusual property that, when subject to a low shear rate, its viscosity is low; while, in contrast, a high shear rate transforms the STF into a high viscosity fluid which may become solid-like in character. This effect is reversible, so that relaxation of the applied shear rate leads to a return of the STF to a low viscosity, flowable state. FIGS. 3(a)-3(c) show an example of one particular RAT embodiment, in which two barbed ribbons are inserted into opposite ends of a length of elastomeric tubing. If the device is stretched slowly, a low shear rate is generated between the ribbons, and the STF remains in a low viscosity state. Under this low extension rate condition, the resistance of the device is primarily due to the elastic response of the tubing. In contrast, if the device is pulled quickly, the STF is transformed into a highly viscous or solid-like material, leading to high resistance to extension. Each RAT 104 has a first end 114, a second end 116, and an intermediate portion 118. Accordingly, the resistance force to extension of the RAT 104 increases as the extension rate of the RAT increases. The RATs 104a, 104b, and 104c are structurally similar to the RAT 104 of FIGS. 3(a)-3(c).

Figure 4A:
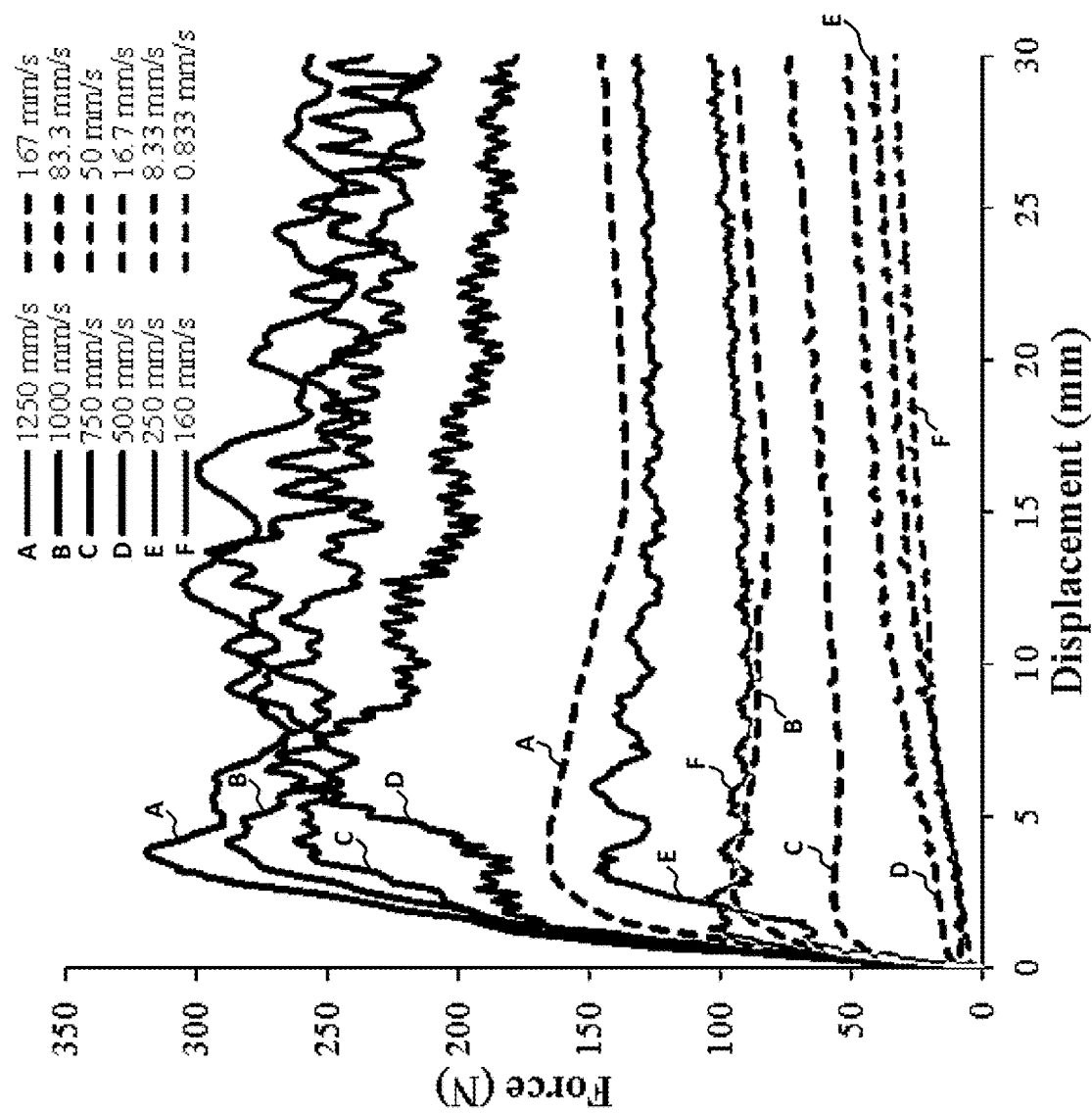
FIGS. 4(a) and 4(b) are graphs illustrating the typical mechanical response of a "T52" RAT, at extension rates of 0.83 mm/s to 1250 mm/s.
Figure 4B:
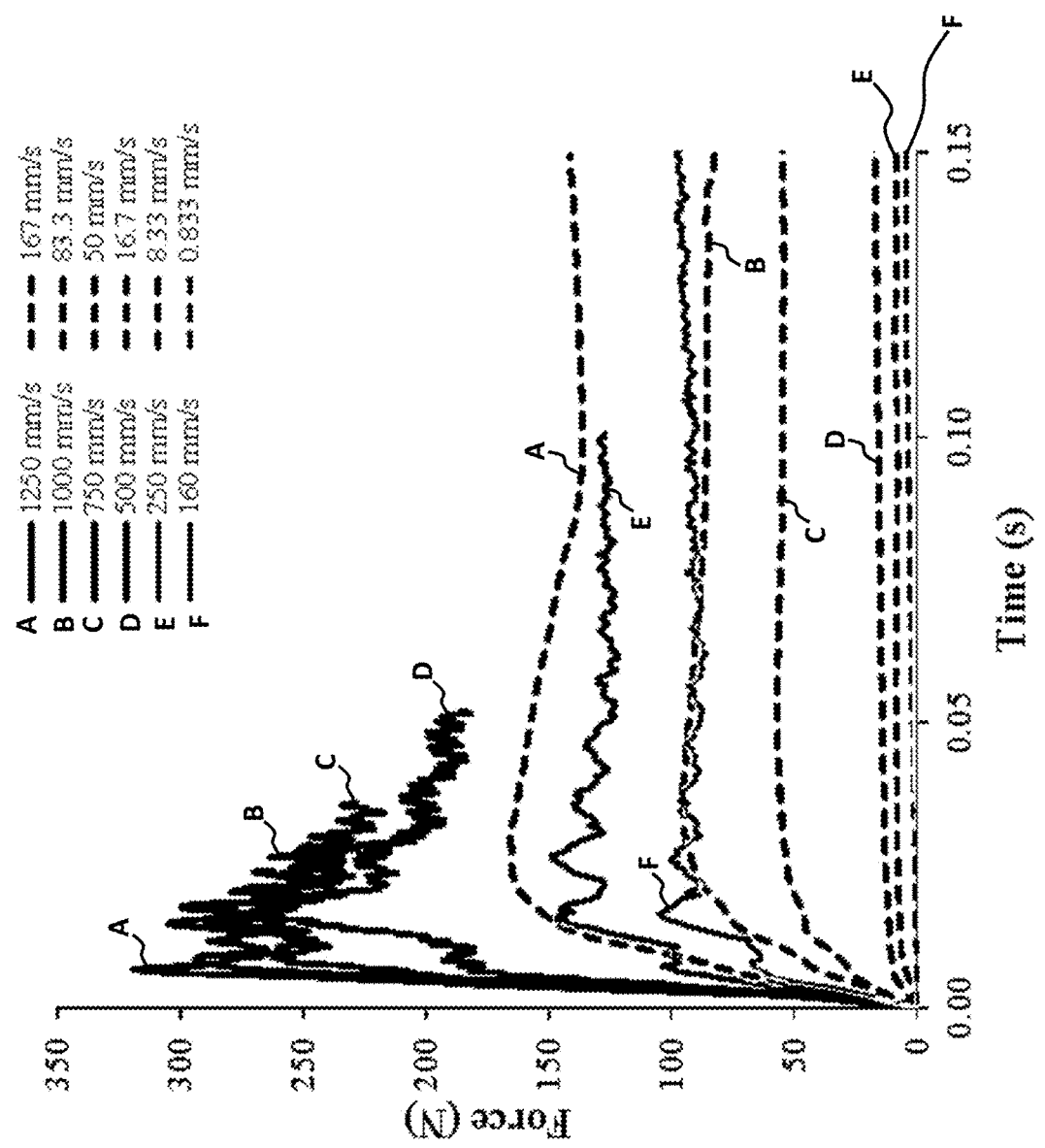

FIGS. 4(a) and 4(b) show a typical mechanical response of a "T52" RAT, at extension rates of 0.83 mm/s to 1250 mm/s. FIG. 4(a) shows a graph of force versus displacement, and FIG. 4(b) shows a graph of force versus time.

FIGS. 4(a) and 4(b) show example performance curves for a typical RAT 104. The tubing 106 is Viton® fluoropolymer elastomer (10 mm ID, 1 mm wall thickness, 127 mm length), the flat, barbed ribbons or filaments 108 are waterjet or laser cut from type 1095 spring steel (0.64 mm thick, 93 mm×7.3 mm area past the barbed section), and the STF 112 is formed of precipitated calcium carbonate (mean size 600 nm) at 52 vol % in a paraffinic oil. We will refer to this RAT as "T52." The data in FIGS. 4(a) and 4(b) is from a hydraulic load frame, subjecting the RATs to tensile loading to a displacement of 30 mm, at extension rates from 0.83 mm/s to 1250 mm/s. Tests are performed in a random order. In FIG. 4(a), force is plotted versus displacement. At low extension rates (16.7 mm/s and below), the force increases somewhat linearly with displacement, and overall force values are low (50 N or less). As the velocity increases, the force response show a rapid initial loading, followed by a relatively steady force value over the full stroke of the device. The steady "plateau" force increases with extension rate until around 750 mm/s. As extension rate increases above 750 mm/s, the extension force increases less rapidly with increasing velocity.

This data demonstrates that RATs exhibit the two key features for an ideal energy absorber: (i) steady force over long strokes, and (ii) a stroke force that increases with stroke velocity and, therefore, is more resistive at higher impact energies (for the condition of a fixed impact mass and increasing impact velocity).

FIG. 4(b) shows, for the same experiments, force as a function of time. Force increases rapidly with time, with peak forces exhibited within 2 ms at the highest extension rates. This data demonstrates that the response of the RATs is very fast, a necessary condition for impulse energy absorption during impact.

FIGS. 5(a)-5(c) shows an example RAT suspension and helmet combination 100. Three pairs of RATs 104 are configured symmetrically to provide energy absorption during impact to the front/rear, left/right, or crown (top) of the helmet 100. In this design, both ends of each RAT are attached to the helmet shell 102, on opposite sides of the head. FIGS. 6(a)-6(b) shows the RATs 104 configured to absorb the energy of impacts to the crown of the helmet shell 102 in isolation to clearly illustrate the response of the RATs 104 that are designed to absorb energy from a crown impact. When the crown is impacted, the helmet moves downward relative to the head, causing extension of the RATs 104, which in turn absorb impact energy. Similar RAT energy absorption modes are apparent for the other pairs of RATs 104 in FIGS. 5(a)-5(c) when impacted from other corresponding directions or ranges of directions as each of the pairs of RATs will be activated by impacts from a range of directions encompassing the corresponding direction, such as front/rear, left/right, or crown, for each pair of RATs.

Referring again to FIGS. 5(a)-5(c) and FIGS. 6(a)-6(b), an embodiment 100 of an impact energy absorbing helmet can be seen. The impact energy absorbing helmet 100 includes a helmet shell 102 and a suspension system 103.

The helmet shell or outer shell 102 will typically be a thick and robust protective structure. The helmet 100 may be configured as a military helmet, sports helmet, first responder helmet, or industrial safety-wear helmet.

The suspension system 103 is connected to the helmet shell 102 and is configured for suspending the helmet shell 102 on a person's head in at least one predetermined direction, such as front/rear, left/right, or crown. In the illustrated embodiment of FIGS. 5(*a*)-5(*c*), the suspension system 103 is designed to suspend the helmet shell 102 over the wearer's head and absorb impact energy in all the front/rear, left/right, and crown directions. The suspension system comprises strapping 105 connected to the helmet shell 102. In some embodiments, the suspension system 103 and the strapping 105 may be one and the same while in others the suspension system 103 will include additional components such as springs, elastic straps, webbing, and foam and/or pneumatic pads or cushions 122, for example. The strapping 105 is positioned at least in part in a space between the head 101 and the helmet shell 102 during use. The suspension system acts between the head 101 and the helmet shell 102 during use. The strapping comprises at least one rate activated tether (RAT) 104, and the suspension system 103 is configured to absorb impact energy and reduce the force transmitted to the head 101.

The helmet shell 102 is configured to be supported on the head 101 of the person by the suspension system 103 such that there is a gap, having a size, between the helmet shell 102 and the head 101. The impact to the helmet shell 102 in at least the predetermined direction, i.e. one of the directions front/rear, left/right, or crown, causes a translation of the shell 102 relative to the head 101, and generates extension of the RAT 104 to absorb the impact's energy and reduce the force transmitted to the head.

The at least one RAT 104 may be configured to extend during an impact to the crown of the helmet, the at least one RAT 104 may be configured to extend during an impact to the rear of the helmet, the at least one RAT 104 may be configured to extend during an impact to the front of the helmet, or the at least one RAT 104 may be configured to extend during an impact to the side of the helmet.

In the illustrated embodiment of FIGS. 5(*a*)-(*c*) the strapping 105 comprises a plurality of RATs 104. Each of the plurality of RATs 104 is configured to extend during an impact in a corresponding range of directions. Each of the plurality of RATs 104 has a first end and a second end, and each of the plurality of RATs 104 is attached to the helmet shell 102 at both its first end and its second end, such that its first and second ends are fixedly located relative to the helmet shell 102 during use. Each of the plurality of RATs 104 has an intermediate portion located between its first end and its second end. Each of the plurality of RATs 104 operatively engages the person's head 101 at its intermediate portion 118 so as to extend in length during an impact in a corresponding range of directions to thereby absorb impact energy and reduce the force transmitted to the head 101.

In the embodiment of FIGS. 5(*a*)-5(*c*), at least one of the plurality of RATs 104 is positioned such that its intermediate portion 118 operatively engages the crown region of the head 101, at least one of the plurality of RATs 104 is positioned such that its intermediate portion 118 operatively engages the frontal region of the head 101, at least one of the plurality of RATs 104 is positioned such that its intermediate portion 118 operatively engages the rear region of the head 101, at least one of the plurality of RATs 104 is positioned such that its intermediate portion 118 operatively engages the right side region of the head 101, and at least one of the plurality of RATs 104 is positioned such that its intermediate portion 118 operatively engages the left side region of the head 101. In one embodiment, at least two of the plurality of RATs 104 are positioned such that their intermediate portions 118 operatively engage the crown region of the head 101. In the embodiment of FIGS. 5(*a*)-5(*c*), the plurality of RATs 104 that engage the sides, front, and rear of the head 101, and which absorb the energy of impacts directed to the sides, front, and rear of the head, are positioned in planes that are generally parallel to the horizontal anatomical plane.

FIGS. 7(*a*)-7(*d*) illustrate a combined design with a RAT suspension and a RAT retention strap 120. FIGS. 7(*a*)-7(*d*) show how a RAT suspension can work in conjunction with a RAT retention strap 120 (e.g. a chinstrap). In the illustrated embodiment, the retention strap 120 may be made entirely of one or more RATs 104*b*; or the retention strap 120 may be include non-extensible strap portions, fasteners, buckles, etc., in addition to one or more RATs 104*b*. The RAT suspension 103 and RAT retention straps 120 are connected to the helmet shell 102, and wrap around the top of the head (the two RATs 104 that engage the crown of the head) and the jaw (RAT 104*b*), respectively, to hold the helmet onto the head 101. For a crown impact, the RAT suspensions 104 absorb energy in the manner described in FIGS. 6(*a*)-(*b*). For an upward impact, such as to the front brim of the helmet 100, the RAT retention strap 120 will extend and absorb the impact energy. Note that the RATs 104 for absorbing side, front, and rear impacts may preferably also be included in the embodiment of FIGS. 7(*a*)-7(*d*), but have been omitted in the interest of clarity of illustration.

The embodiment of FIGS. 7(*a*)-7(*d*), further comprises a retention system configured to hold the helmet 100 onto the head 101. The embodiment of FIGS. 7(*a*)-7(*d*) is otherwise identical to the embodiments of FIGS. 5(*a*)-(*c*) and FIGS. 6(*a*)-6(*b*). In the illustrated example, the retention system comprises a retention strap 120 comprising at least one rate activated tethers (RAT) 104*b*. The retention system is operatively coupled to the helmet shell 102 at least in part by the at least one RAT 104*b*. At least upward impacts to the helmet shell 102 will cause a displacement of the shell 102 relative to the head 101, and generate extension of the at least one RAT 104*b* of the retention system to absorb impact energy and reduce the force transmitted to the head. The retention strap 120 may be in the form of a chinstrap or a ratcheting head strap that tightens the strap around the head. The chinstrap or the ratcheting head strap will then comprise the at least one RAT 104*b*.

In some embodiments, a plurality of RATs are located in sets of planes with each set of planes including planes having specified orientations with respect to specified anatomical axes or anatomical planes of the human head or body. Examples of such sets of planes include, without limitation, the set of planes rotated about a horizontal anatomical axis through the approximate center of the head and the set of planes that are parallel to the coronal anatomical plane. The word "set" may be omitted at times for convenience.

FIGS. 8(*a*)-8(*c*) show an alternative RAT configuration, in which RATs 104 are located in planes rotated about a horizontal anatomical axis through the approximate center of the head 101. FIGS. 8(*g*)-8(*i*) show a sketch and photographs of a prototype suspensions constructed in this manner. FIGS. 8(*d*)-8(*f*) show an alternative RAT configuration, in which the RATs are located in planes rotated about a sagittal anatomical axis through the approximate center of the head 101. FIGS. 8(*j*)-8(*k*) show a prototype and sketch for a suspension with RAT elements 104 located in planes rotated about the longitudinal anatomical axis. The embodiments of FIGS. 8(a)-8(i) are similar in construction to the embodiments of FIGS. 5(a)-7(d) in that each RAT 104 is connected to the interior surface of the helmet shell 102 at both ends.

Figure 8J:
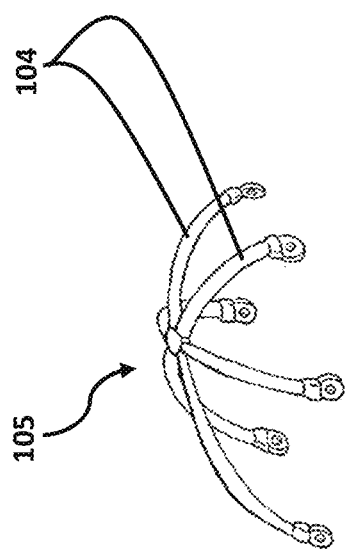
FIGS. 8(j)-8(k) are a schematic view and a photograph showing a RAT suspension prototype in which the RATs are located in planes rotated about the longitudinal anatomical axis.
Figure 8K:
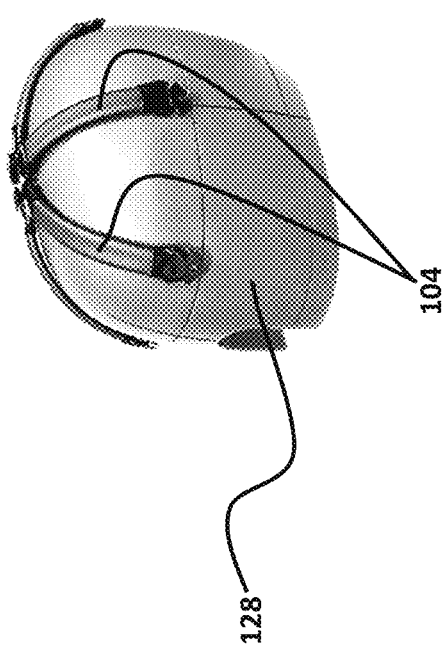

In the embodiments of FIGS. 8(a)-8(c) and 8(g)-8(i), the plurality of RATs 104 are positioned in planes that rotate about a horizontal anatomical axis through the approximate center of the head. By "rotate about an axis," it is meant that the planes of the RATs 104 are radially distributed about the axis. In the embodiments of FIGS. 8(d)-8(f), the plurality of RATs 104 are positioned in planes that rotate about a sagittal anatomical axis through the approximate center of the head. In the embodiments of FIGS. 8(j)-8(k), the plurality of RATs 104 are positioned in planes that rotate about a longitudinal anatomical axis through the approximate center of the head. The embodiments of FIGS. 8(j)-8(k) differ in construction from the embodiments of FIGS. 5(a)-8(i) in that each RAT 104 is connected to the interior surface of the helmet shell 102 at one end, while the other ends of the RATs 104 are connected together and bear against the crown of the head 101 to absorb the energy of impacts to the crown or top of the helmet.

Accordingly, in a disclosed embodiment, each of the plurality of RATs 104 has a first end and a second end, each of the plurality of RATs 104 is attached to the helmet shell 102 at its first end, and the second ends of the plurality of RATs 104 are attached together such that the plurality of RATs 104 are positioned in planes that rotate about a longitudinal anatomical axis through the approximate center of the head 101. Furthermore, in this example, the first end of each of the plurality of RATs 104 is fixedly located relative to the helmet shell 102 during use, the second ends of the plurality of RATs are located over the crown region of the head, and each of the plurality of RATs 104 operatively engages the crown region of the person's head at least at its second end so as to extend in length at least during a downward impact to the crown of the helmet shell 102 to thereby absorb impact energy and reduce the force transmitted to the head.

In the embodiments of FIGS. 8(a)-8(c) and 8(g)-8(i), if the attachment points for the ends of the RATs 104 are evenly distributed along horizontal lines on either side of the interior of the helmet shell 102, or if the RATs 104 are oriented to lie in parallel vertical planes, then the plurality RATs 104 will be positioned in planes that are parallel to the coronal anatomical plane. When the attachment points for the ends of the RATs 104 are radially distributed on either side of the interior of the helmet shell 102 about a horizontal anatomical axis through the approximate center of the head, or if the attachment points for the ends of the RATs 104 are at approximately the same position on either side of the interior of the helmet shell 102, then the plurality RATs 104 will be positioned in planes that are approximately radially distributed about a horizontal anatomical axis through the approximate center of the head.

In the embodiments of FIGS. 8(d)-8(f), if the attachment points for the ends of the RATs 104 are evenly distributed along horizontal lines on the front and rear of the interior of the helmet shell 102, or if the RATs 104 are oriented to lie in parallel vertical planes, then the plurality RATs 104 will be positioned in planes that are parallel to the sagittal anatomical plane. When the attachment points for the ends of the RATs 104 are radially distributed on the front and rear of the interior of the helmet shell 102 about a sagittal anatomical axis through the approximate center of the head, or if the attachment points for the ends of the RATs 104 are at approximately the same position on the front and rear of the interior of the helmet shell 102, then the plurality RATs 104 will be positioned in planes that are approximately radially distributed about a sagittal anatomical axis through the approximate center of the head.

FIGS. 9(a)-9(c) show an alternative configuration for RAT suspension, in which RATs are located in multiple planes to create a "net" of RATs 104. FIGS. 9(a)-9(c) show a combination of RATs 104, creating a net-like suspension system. The RATs 104 in this configuration could be interwoven to create a wide array of textile-like or mesh-like energy absorbers.

In the embodiment of FIGS. 9(a)-9(c), a first number of the plurality of RATs 104 are positioned in planes that rotate about a sagittal anatomical axis through the approximate center of the head, or that are approximately parallel to the sagittal anatomical plane. A second number of the plurality of RATs 104 are positioned in planes that rotate about a horizontal anatomical axis through the approximate center of the head, or that are approximately parallel to the coronal anatomical plane. Accordingly, a net-like or mesh-like energy absorbing structure is formed.

Referring to FIGS. 10(a)-10(d), further embodiments 200 disclosed herein comprise an inner shell 202 configured to closely fit to the head 101 of the person, while the helmet shell 102 is configured to be supported by the suspension system 203 such that there is a gap, having a size, between the helmet shell 102 and the inner shell 202 to allow the helmet shell to displace relative to the inner shell upon impact; and there is at least one RAT 104, 104a coupling the inner shell 202 to the helmet shell 102, wherein impact to the helmet shell 102 causes a displacement of the helmet shell 102 relative to the inner shell 202, and generates extension of the at least one RAT 104 to absorb impact energy and reduce the force transmitted to the head. The inner shell 202 may comprise a rigid composite, flexible plastic, fabric, an array of thin plastic elements, or an array of fabric or webbed elements.

In some embodiments, the at least one RAT 104, 104a is located between the inner shell 202 and the helmet shell 102. The suspension system 203 includes strapping 205 that includes one or more RATs 104 and may include connecting hardware, adjustment hardware, releasable strap fasteners, buckles, etc. The strapping 205 may include inextensible strapping and additional connectors and hardware in addition to the one or more RATs 104, 104a.

In some embodiments, the strapping 205 comprises a plurality of RATs 104, 104a, while each of the plurality of RATs 104, 104a is configured to extend during an impact in a corresponding range of directions, and wherein each of the plurality of RATs 104, 104a has a first end 114 and a second end 116. Each of the plurality of RATs 104, 104a is attached to the helmet shell 102 at its first end 114, the second ends 116 of the plurality of RATs 104, 104a is attached to the inner shell 202. Thus, the plurality of rate activated tethers (RATs) 104, 104a couple the inner shell 202 to the helmet shell 102.

In one disclosed embodiment, the inner shell 202 has a crown portion, each of the plurality of RATs 104 has a first end 114 and a second end 116, each of the plurality of RATs 104 is attached to the helmet shell 102 at its first end, and the second ends 116 of the plurality of RATs 104 are attached to the crown portion of the inner shell 202 such that the plurality of RATs 104 are positioned in planes that rotate about a longitudinal anatomical axis through the approximate center of the wearer's head 101. The first end 114 of each of the plurality of RATs 104 is fixedly located relative to the helmet shell 102 during use, the second ends 116 of the plurality of RATs 104 are located over the crown region of the head when the embodiment is in use, and each of the plurality of RATs 104 operatively engages the inner shell 202 at least at the second end 116 of each of the plurality of RATs 104 such that each of the plurality of RATs 104 extends in length at least during a downward impact to the crown of the helmet shell 102 to thereby absorb impact energy and reduce the force transmitted to the head 101.

An embodiment disclosed herein further comprises a second plurality of RATs 104a. Each of the second plurality of RATs 104a operatively engages the helmet shell 102 and the inner shell 202, each of the second plurality of RATs 104a extends in a transverse or horizontal anatomical plane of the head such that a corresponding one or more of the second plurality of RATs 104a will extend in length at least during any one of a front, rear, left, or right impact to the helmet shell 102 to thereby absorb impact energy and reduce the force transmitted to the head. The RATs 104 and the RATs 104a are structurally similar as exemplified by the RAT of FIGS. 3(a)-3(c), and the 104a numeral is only used as a convenient way to distinguish the first and second pluralities of RATs. The first and second pluralities of RATs differ only in their plane of orientation and can be thought of as being parts of one larger plurality of RATs, which is how they were treated in earlier descriptions of the disclosed embodiments and how they will be treated in subsequent descriptions of the disclosed embodiments when there is no loss of clarity.

FIGS. 10(a)-10(d) show a different helmet design approach, in which the helmet comprises an outer shell, and inner shell, and a series of RATs connecting the inner shell to the outer shell. FIGS. 10(a)-10(c) show directional views, and FIG. 10(d) shows an isometric view. Typically, the outer shell 102 will be a thick and robust protective structure, such as a 2-mm-thick polycarbonate shell as used in sports helmets, or a 10-mm-thick fiber-reinforced polymer composite shell, as used in military helmets. The inner shell is likely to be a thinner material, such as a 0.5-mm-thick nylon frame with a 1-mm-thick layer of comfort felt or padding between nylon frame and the head. The number of RATs, orientation of RATs, and positions of the RAT connection points to the inner shell and outer shell can be varied to achieve protection from impacts from a full range of directions.

FIGS. 11(a)-11(c) show an embodiment of a helmet with an inner shell 202, outer shell 102, and connecting RATs 104, subject to impacts that induce translational or rotational motions on the helmet outer shell 102. In this design, RATs 104 are forced into extension in both forms of impact, and therefore provide protection against both rotational and translational accelerations.

Accordingly, referring to FIGS. 11(a)-11(c), in some of the embodiments disclosed herein, when an impact to the helmet shell 102 causes a rotation of the helmet shell 102 relative to the inner shell 202, the rotation of the helmet shell 102 relative to the inner shell 202 generates extension of one or more of the plurality of RATs 104 to absorb impact energy and reduce the force transmitted to the head.

Figure 12:
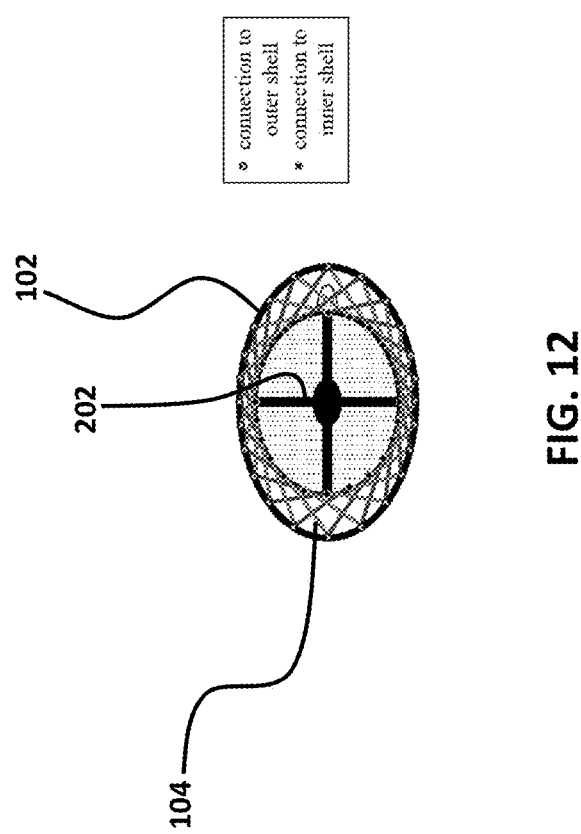
FIG. 12 is a schematic view showing a suspension design in which a large number of RATs connect an inner shell to an outer shell.

FIG. 12 shows a suspension that also has an inner shell 202, an outer shell 102, and RATs 104 connecting the inner shell to the outer shell. However, in this design, a large number of RATs 104 are used to connect the inner to the outer shells, resulting in protection from impacts from many directions. Although FIG. 12 shows only RATs 104 nominally arrayed in a single plane, it is contemplated that this design can be readily extended to have RATs 104 oriented in multiple planes to absorb translational and rotational motions in all planes.

Referring to FIGS. 7(a)-7(d), 11(a)-11(c), 12, and 13(a)-13(c), when an impact to the helmet shell 102 causes a rotation of the helmet shell 102 relative to the head 101, the rotation of the helmet shell 102 relative to the head generates extension of one or more of the plurality of RATs 104 to absorb impact energy and reduce the force transmitted to the head. One or more of the plurality of RATs 104 are configured to extend during a helmet rotation parallel to the sagittal plane of the head, as are any RATs 104b incorporated in the chinstrap of the Helmet, as for example may be caused by an upward impact to the front brim of the helmet shell 102 similar to the type of impact for illustrated in FIG. 7(c). This type of impact would cause extension of the RATs 104 extending from the crown of the inner shell 202 toward the rear portion of the helmet shell 102. One or more of the plurality of RATs 104 are configured to extend during a helmet rotation parallel to the coronal plane of the head RATs 104 as for example may be caused by an upward impact to the left or right side brim of the helmet shell 102. One or more of the plurality of RATs 104 are configured to extend during a helmet rotation parallel to the transverse or horizontal plane of the head as illustrated in FIG. 11(c).

Referring to FIGS. 13(a)-13(b), An embodiment disclosed herein, provides for a helmet that is configured to be retained on the head using a retention system 120a comprising at least one additional RAT 104b. Such an embodiment comprises a retention system configured to hold the helmet onto the head. The retention system comprises at least one rate activated tethers (RAT) 104b, and the retention system is operatively coupled to the inner shell 202 at least in part by the at least one RAT 104b. When an impact to the helmet shell 102 causes a displacement of the inner shell 202 relative to the head and generates extension of the at least one RAT 104b coupling the retention system and the inner shell 202, the at least one RAT 104b absorbs impact energy and reduces the force transmitted to the head 101.

FIGS. 13(a)-13(b) show a suspension design with an inner shell 202, an outer shell 102, RATs 104 connecting the inner shell to the outer shell, and RATs 104b used as a retention strap 120a around the jaw of the wearer. In this embodiment, impacts to the outer helmet shell are absorbed by RATs 104, 104b, include upward impacts on the helmet brim that would cause the helmet to lift off of the head.

Referring to FIGS. 14(a)-14(b) and FIGS. 15(a)-15(b), the inner shell 202a, 202b comprises one or more RATs 104c, in other words at least one additional RAT 104c.

FIGS. 14(a)-14(b) show a suspension embodiment having an inner shell 202a, an outer shell 102, RATs 104 connecting the inner shell 202a to the outer shell 102, RATs 104b being used as a retention strap 120a around the jaw of the wearer, and RATs 104c being integrated into the inner shell 202a. Including RATs 104c as part of the inner shell 202a could provide advantages, such as a more comfortable feel and a tighter fit that limits helmet motion during running.

FIGS. 15(a)-15(b) show a suspension design in which individual RATs 104c are arranged as circumferential bands within an inner shell 202b. RATs 104c in this arrangement will grow radially when loading is applied from the helmet through additional webbing.

In some embodiments herein, the at least one RAT 104, 104a, 104b, 104c operates in parallel with other energy absorbing devices including springs, elastic straps, dampers, foam pads 122, pneumatic elements or elastomeric trusses. In other embodiments herein, the at least one RAT 104, 104a, 104b, 104c operates in series with other energy absorbing devices including springs, elastic straps, dampers, foam pads 122, pneumatic elements or elastomeric trusses. In yet other embodiments herein, a combination of these configurations may be used. In the context of using RATs with other energy absorbing devices, the terms "series" and "series configuration" are used interchangeably herein, the choice between the two depending upon which form would be more grammatically appropriate. Similarly in this context, the terms "parallel" and "parallel configuration" are used interchangeably herein and again the choice between the two depending upon which form would be more grammatically appropriate.

Figure 16:
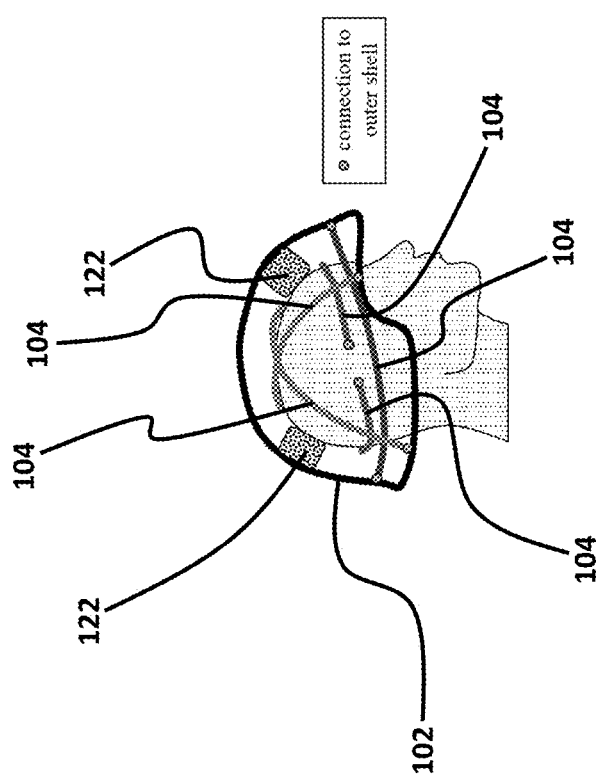
FIG. 16 is a schematic view showing the suspension design in which RATs are used in parallel with foam pads.
Figures 17A, 17B:
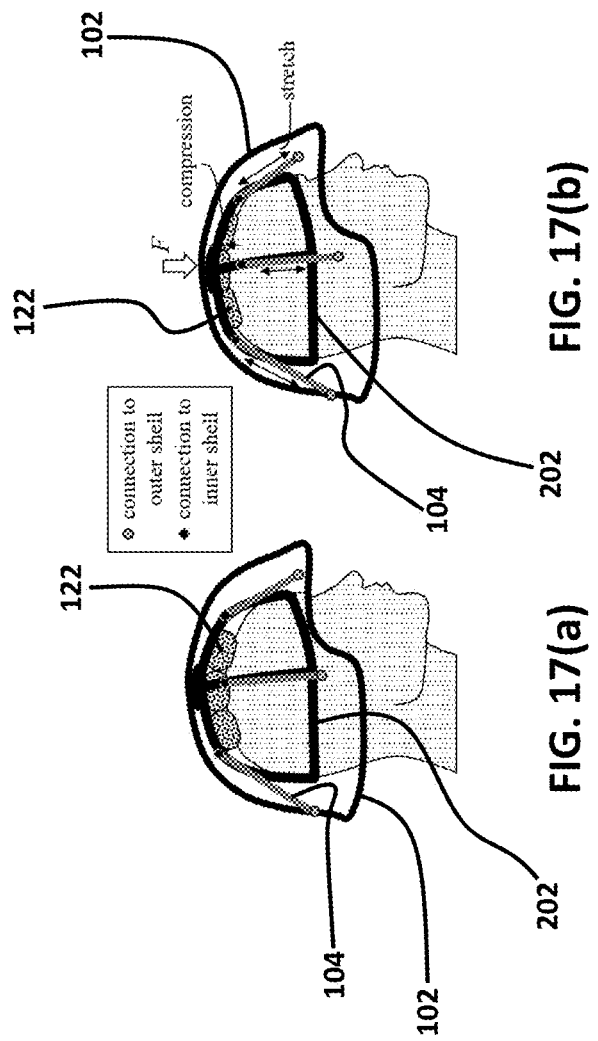
FIGS. 17(a)-17(b) are schematic views showing a suspension in which RATs are used parallel with foam pads and in conjunction with an inner shell.
Figures 18A, 18B, 18C, 18D, 18E:
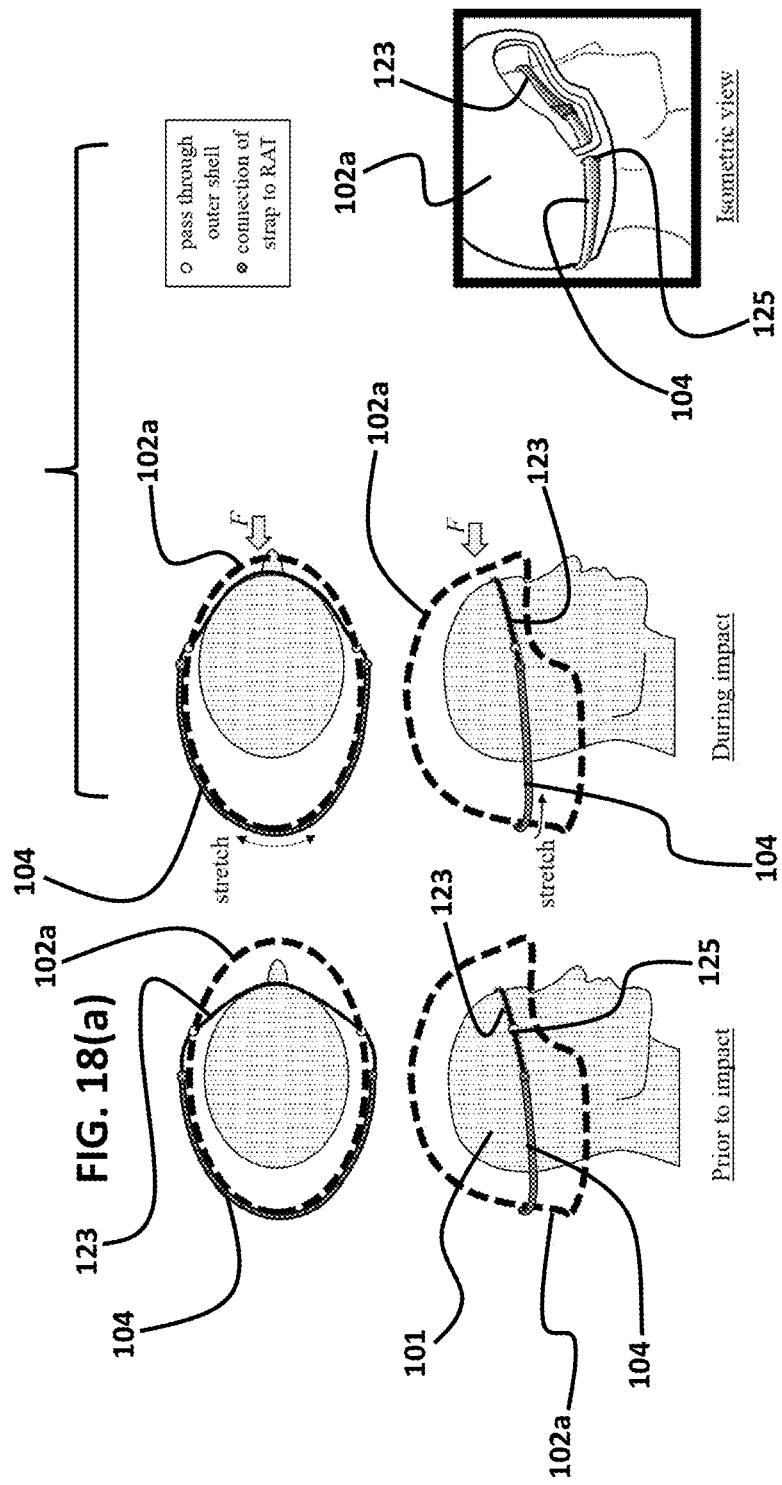
FIGS. 18(a)-18(e) are schematic views showing a suspension design in which RATs are placed outside of the helmet shell, and are coupled to the head via a thin strap that passes through the helmet shell and is in close contact with the head.

Accordingly, RATs 104 are expected to be used as stand-alone suspension elements, or in conjunction with conventional energy absorbing elements. FIG. 16 shows a design in which foam pads 122 are mounted in the helmet in parallel with the RAT suspension 103. This design could provide improved energy absorption and comfort relative to a design formed of only pads or only RATs. Similarly, RATs 104 could be configured in series with energy absorbing elements. For example, an elastic material could be used to connect the RATs 104 to the helmet shell 102, so that loads on the helmet shell would deform the elastic element while also loading the RAT. The combination of foam pads 122, elastic elements, and RATs 104, in series and/or in parallel, is expected to lead to a helmet design of optimal performance and comfort. We also envision conventional fitting technologies, such as chinstraps, pneumatic pads, and ratcheting head straps, to work in parallel with RAT elements to optimize fit and comfort. FIGS. 17(a)-17(b) show another variant in which foam pads 122 are combined with RATs 104 in a helmet design with an inner shell 202 and an outer shell 102.

In one embodiment, illustrated in FIGS. 18(a)-18(e), the helmet shell 102a has a rear portion, the at least one RAT 104 is connected to a strap or cable 123 configured to extend around the frontal region of the head 101, and the strap 123 passes through the helmet shell 102a and is connected at either end to the ends of an RAT 104 that is positioned to extend around the rear portion of the helmet shell 102a. The helmet shell 102a differs from the helmet shell 102 in that the helmet shell 102a has openings 125 that allow the strap 123 to be routed through those openings and attached to the RAT 104 that is positioned around the rear portion of the helmet shell 102a.

Conventional foam pads are designed to absorb energy in compression. RATs 104, in contrast, are designed to absorb energy in tension. A unique property of a tensile energy absorber is that it is straightforward to transmit tensile loads through compact and flexible material elements, such as straps and cables. FIGS. 18(a)-18(e) show a design that takes advantage of this principle. FIGS. 18(a)-18(e) show a suspension design in which RATs 104 are placed outside of the helmet shell 102a, and are coupled to the head via a thin strap 123 that passes through the helmet shell 102a and is in close contact with the head. The RAT energy absorber is attached to the flexible, inextensible strap 123, such as nylon webbing, that passes through the helmet shell 102a to sit tightly on the forehead of the wearer. An impact to the front of the helmet creates tension in the inextensible strap 123, which transmits that tension to the RAT 104, causing the RAT 104 to absorb energy from the impact. Although impact from only one direction is shown in FIGS. 18(a)-18(e), it would be understood that additional similar strap and RAT arrangements may be employed to absorb energy from a wide range of impact directions. In this design, the stretching occurs in a RAT 104 that is in circumferential contact with the helmet shell 102a, rather than the forehead of the wearer, which may offer advantages in achieving consistent extensional response where body oil and perspiration may not be consistently present. Furthermore, the RAT may be routed through hollow channels in helmet shell that offer additional protection from the elements, body fluids, or incidental damage.

The primary advantage of this approach is that it maximizes the available stroke for the outer helmet shell. For impact energy absorption, longer strokes reduce the average force necessary to absorb the impact energy, reducing the likelihood of injury. The maximum possible stroke is first limited by the size of the gap between the helmet shell and the head. While it would be effective to increase the helmet shell size to increase this gap distance, generally helmet designers try to minimize shell size for the following reasons: (a) a large helmet shell results in more weight, which reduces comfort and can increase the likelihood of neck injuries, (b) a larger helmet shell can impede mobility, such as limiting the ability of a soldier wearing a helmet from escaping from a heavily damaged ground vehicle, (c) most wearers reject the aesthetics of a large helmet shell, which can look awkward, and (d) as the center of mass of the helmet moves further away from the head, rotational loading to the head increases during non-centric impacts. For a foam pad in compression, located between the head and the outer shell, stroke is limited due to densification of the foam. A foam pad will typically undergo a rapid rise in force, followed be a more gradual rise in force over a moderate stroke length. Typically this stroke distance is up to around 60% compressive strain in the pad, and represents the preferred stroke distance for a foam pad in compression. After around 60% strain, the majority of the pores in the foam have been collapsed, and the foam pad begins to behave like a solid body. Forces then increase dramatically with strain, reaching a limiting strain of around 80% where little further compression is possible. Therefore, for compressive foam pads, only around 60% of the gap between the helmet shell and the head is available for injury-limiting stroke.

In contrast, for the design shown in FIGS. 18(a)-18(e), only a thin strap 123 is present between the head and the helmet shell. Therefore, nearly all of the gap between the head and shell is available for stroke or the maximum amount of movement available between the wearer's head and the helmet shell 102a for decelerating the head and absorbing impact energy. In comparison to a compressive pad that can only stroke 60% of this gap, stroking for the full gap will result in a 67% increase in stroke distance. This increase in stroke distance corresponds to a 67% increase in possible impact energy absorption, for the same peak force during impact; or, a reduction of the peak force value by 40%, for the same impact energy. These performance improvements could be even greater, considering the fundamental advantages of RAT energy absorbers—a steady, rate-sensitive force plateau over long strokes—combined with the potential for very long stroke length via remote location of the RATs.

Referring to FIGS. 19(a)-19(b), in one embodiment, the at least one RAT 104 is located remotely from the head 101, along the neck, shoulders, front of the torso, side of the torso, or back of the torso. In the exemplary embodiment of FIGS. 19(a)-19(b), the helmet shell 102 has a frontal portion, the at least one RAT 104 is located remotely from the head, along the back of the torso, and the at least one RAT 104 is connected to a inextensible strap 124 configured to extend over the crown of the head 101 and attach to the frontal portion of the helmet shell 102.

FIGS. 19(a)-19(b) show a suspension design in which RATs are placed remotely from the head, for example mounted to the torso of the wearer. A strap or cable 124 is used to transmit helmet shell loads to the remote RAT 104. The embodiment of FIGS. 19(a)-19(b) further expands upon the concept, in which the RATs are located remotely from the helmet. In the schematic, the RATs 104 are located on the body, such as worn in a backpack or integrated into clothing. Relative displacement of the outer shell 102 relative to the head 101 creates displacement in a flexible element, such as a strap or cable 124, which then transmits that displacement remotely to the RAT 104, inducing extension of the RAT 104. The advantage of this design is that the stroke length between the helmet shell and head are maximized, and the helmet weight is reduced by locating the energy absorbers 104 on the body. Since the body can bear significantly more weight than the head, reducing the weight on the head is likely to reduce musculoskeletal injuries such as neck sprains.

Figure 21A:
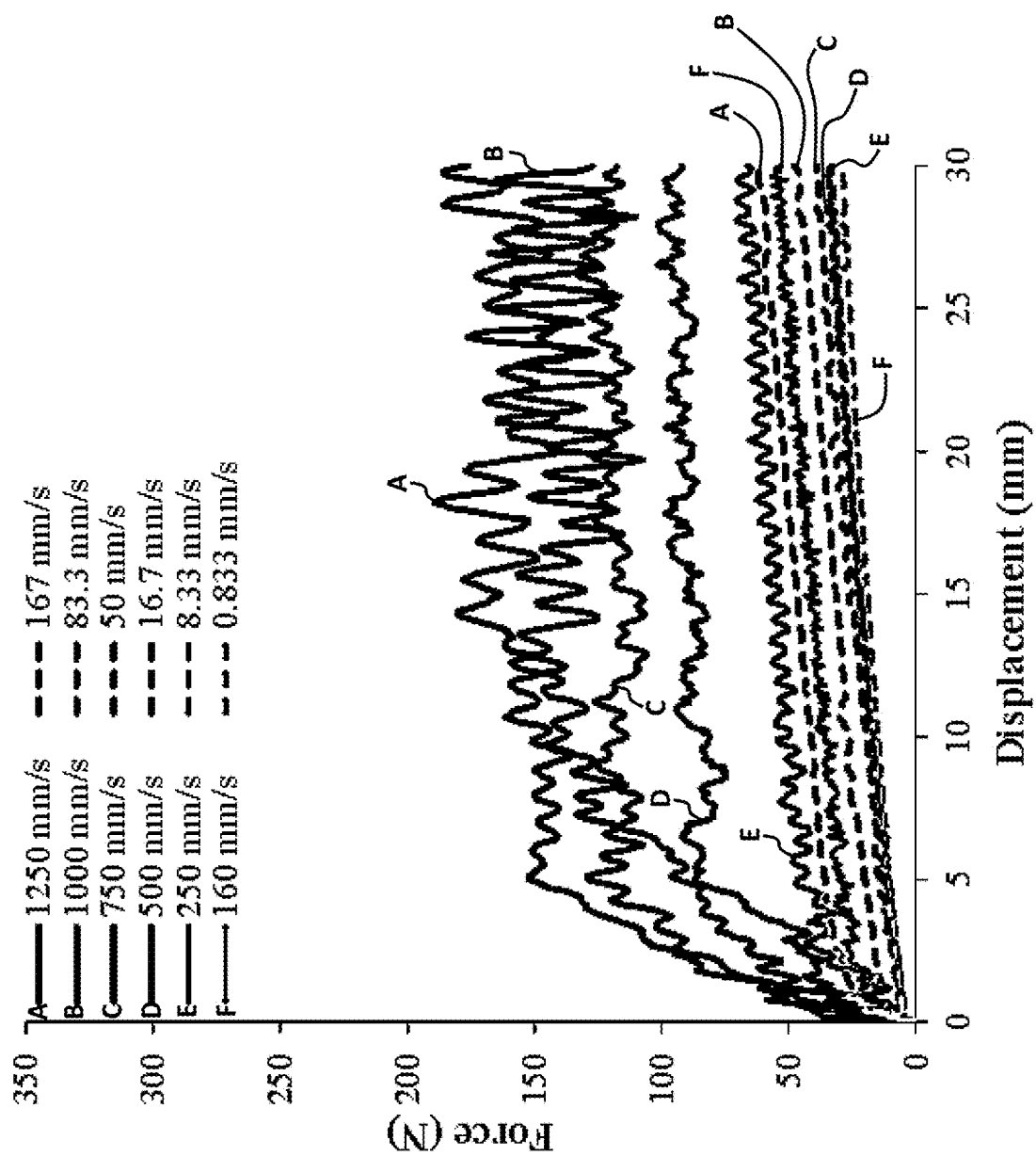
FIGS. 21(a)-21(b) are graphs showing the typical mechanical response of a "T50" RAT, at extension rates of 0.83 mm/s to 1250 mm/s. ((a) Force versus displacement, and (b) force versus time.)
Figure 21B:
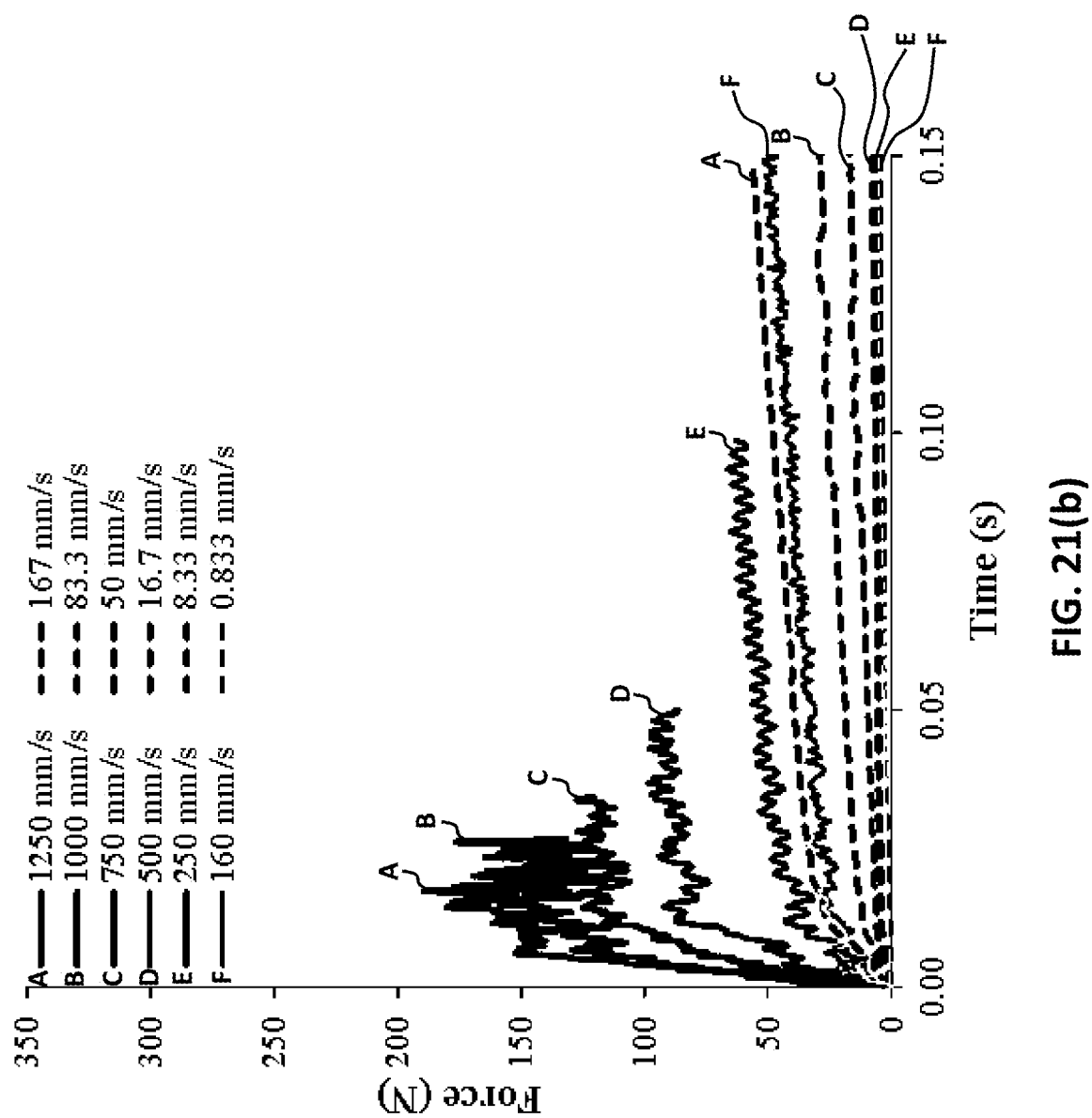
Figure 22A:
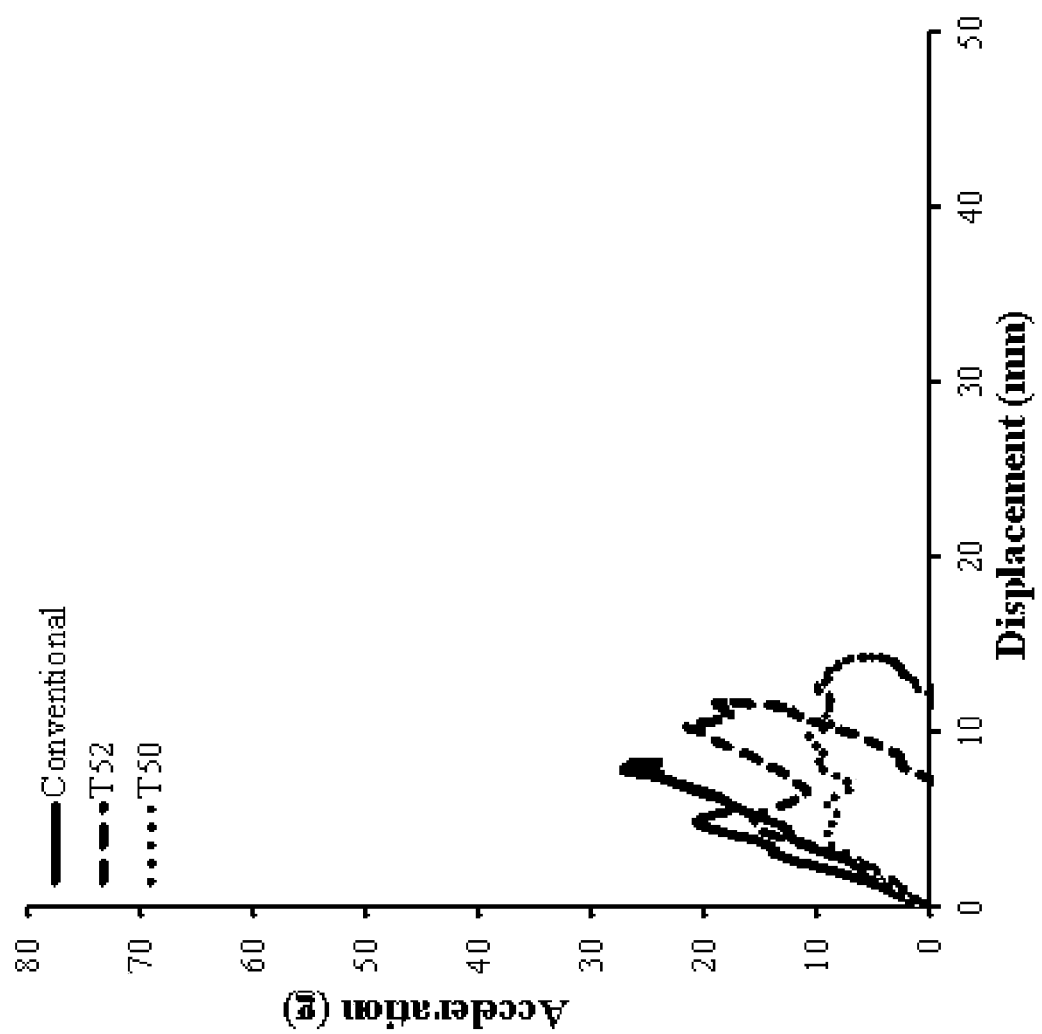
FIGS. 22(a)-22(d) are graphs showing the measured headform acceleration during impact as a function of headform displacement for several drop velocities, comparing helmets with conventional, T52 RAT, and T50 RAT suspensions.
Figure 22B:
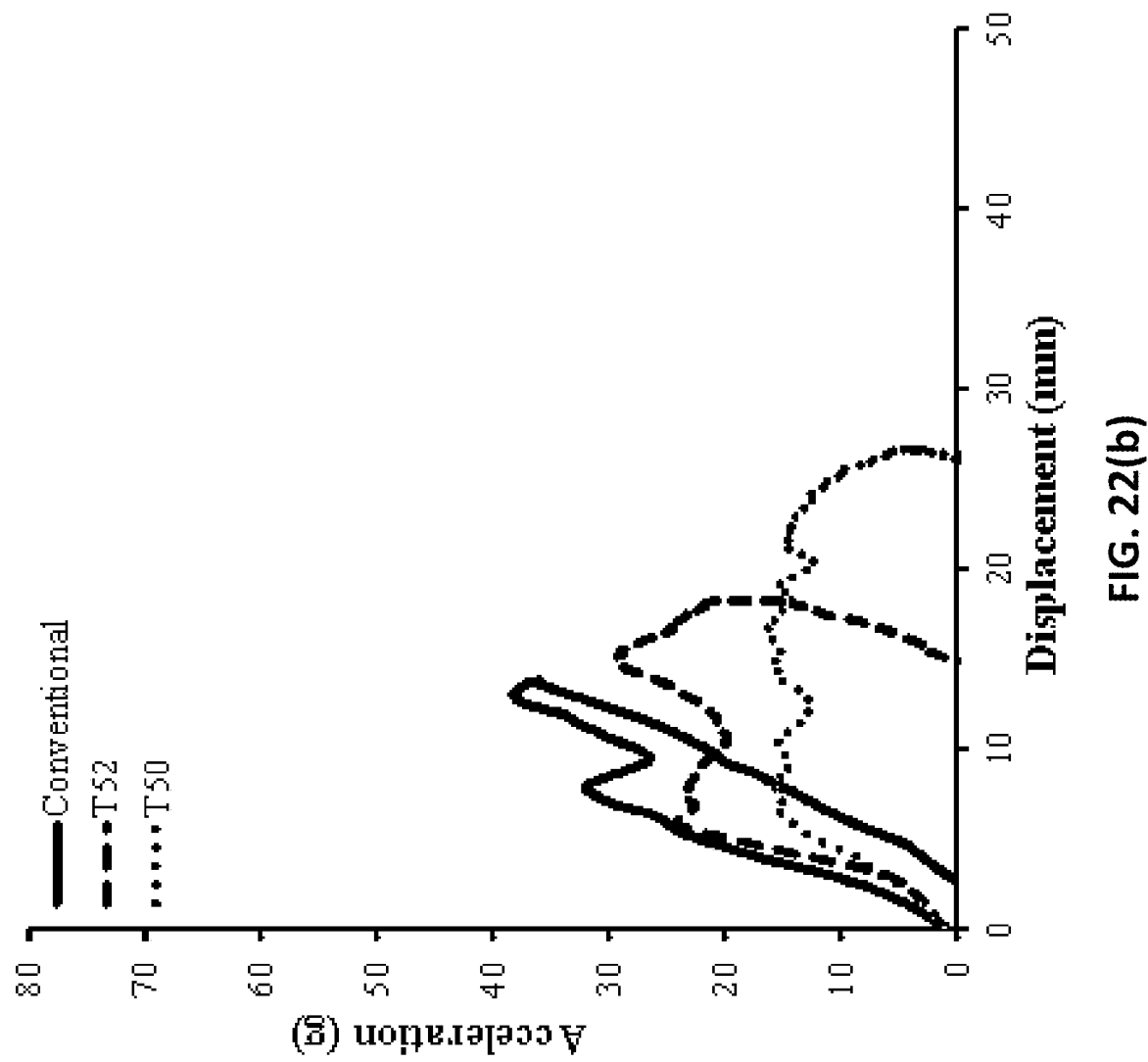
Figure 22C:
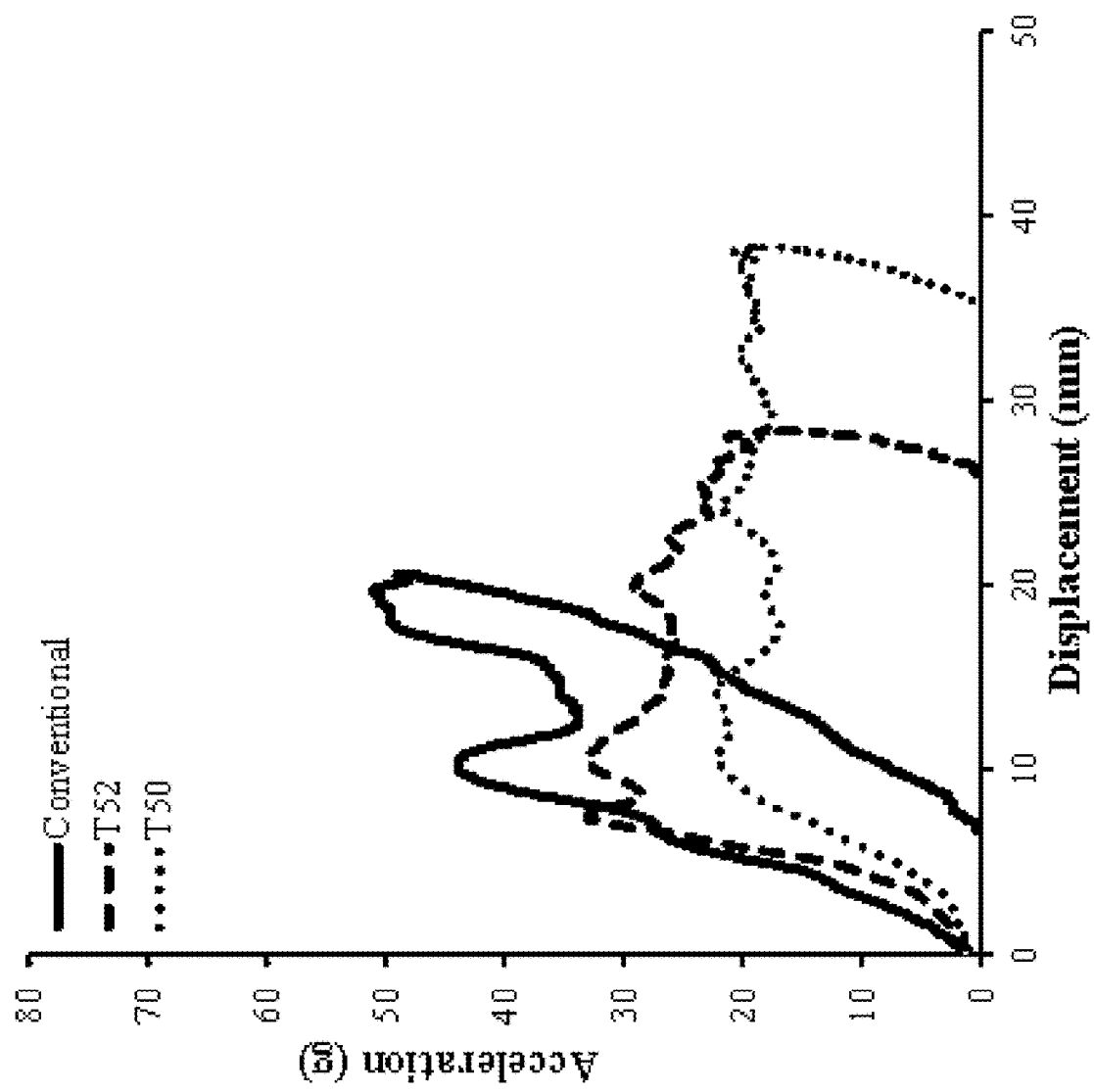
Figure 22D:
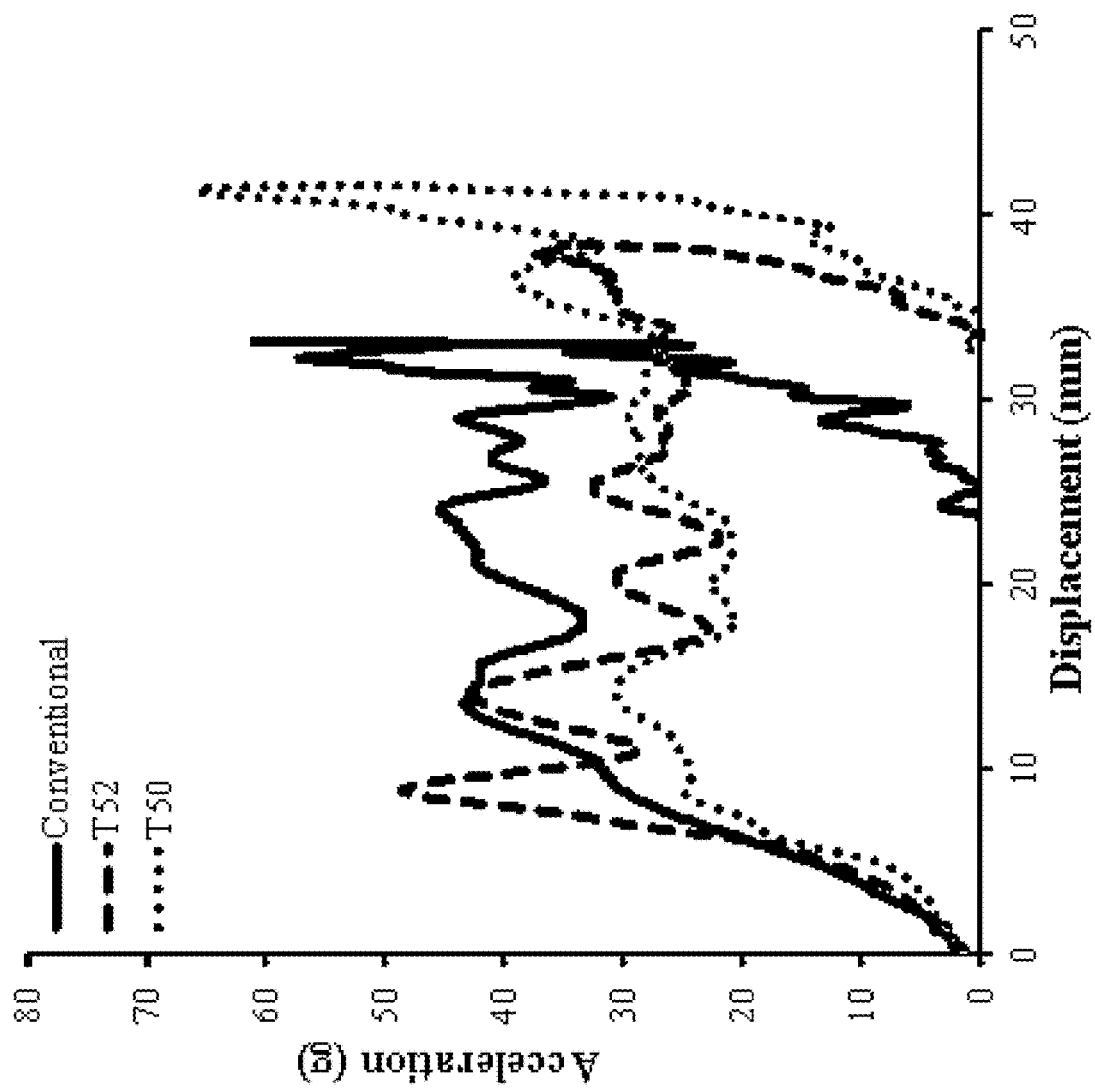

FIGS. 20(a)-20(c) show photographs of a construction hardhat with a conventional strap-based suspension system, and FIGS. 20(d)-20(f) show photographs of a hardhat, comprising a helmet shell 102, in which the conventional strap suspension system 126 has been removed and then replaced with a RAT suspension system 103 to provide a RAT suspension system prototype. The RAT suspension is configured primarily for crown impacts, and attaches to the outer shell of the helmet, similar in concept to FIGS. 6(a)-6(b) or FIGS. 8(j)-8(k). Two RAT suspension systems were constructed, one using the T52 RATs whose mechanical response was shown in FIGS. 4(a)-4(b). A second set was made identically to the T52 RATs, but with an STF formed of 50 vol % particles. These RATs are referred to as "T50" RATs, and their mechanical performance is given in FIGS. 21(a)-21(b). FIGS. 21(a)-21(b) show the typical mechanical response of a "T50" RAT, at extension rates of 0.83 mm/s to 1250 mm/s. FIG. 21(a) shows the force versus displacement, and FIG. 21(b) shows the force versus time. Compared to the T52 RATs, forces are lower at identical speeds—for example, at 1250 m/s, the T52 RATs resist with 250-300 N of force, while the T50 RATs resist with 150-200 N of force. We were not able to perform extensional experiments at higher velocities, but based on prior experience it is possible that the T50 RAT forces would increase to 250-300 N of force at higher extensional rates. Based on the gap between the suspensions and the helmet shell, a maximum displacement of around 40 mm is possible before "bottoming out", or collision of the headform with the inside of the helmet shell, would occur.

Helmets were tested according to American National Standards (ANSI) and International Safety Equipment Association (ISEA) standard Z89.1-2014. In summary, the helmets are mounted onto a 5 kg headform 128, and dropped onto a rigid steel hemi-spherical anvil. Tests were configured to achieve a crown impact. Impact heights were varied to achieve impact velocities of 1.5 m/s, 2.5 m/s, 3.5 m/s, and 4.5 m/s, although the test standard only requires testing at 3.5 m/s. An accelerometer inside the headform records headform acceleration as a function of time. This data can be integrated to calculate headform displacement as a function of time. Helmet impact data was also characterized via head injury criterion (HIC) values, calculated as:

$$HIC = \left\{ (\Delta t) \left[ \frac{1}{\Delta t} \int_{t_0}^{t_0 + \Delta t} a(t) dt \right]^{5/2} \right\}_{max}$$

where a is acceleration, t is time, and integration occurs over the time interval from $t_o$ to $t_o + \Delta t$ where $t_o$ is selected to provide the maximum HIC value. The HIC captures the combined effects of intensity and duration of acceleration, and provides a complementary metric to peak acceleration values. A $\Delta t$ value of 15 ms was used for all calculations. FIGS. 22(a)-22(d) shows measured headform acceleration during impact as a function of headform displacement, for the conventional, T52 RAT, and T50 RAT suspensions, at drop velocities of 1.5 m/s, 2.5 m/s, 3.5 m/s, and 4.5 m/s. A number of features are visually apparent. First, the RATs produce a steadier acceleration over longer displacements, compared to the conventional suspension. This behavior is consistent with the ideal response that is desirable for an impact absorbing suspension. Second, it is apparent that the RAT suspensions produce lower peak acceleration values compared to the conventional suspension system, which would be expected to reduce the likelihood of head and brain injury.

The ANSI test standard sets an acceleration limit of 150 g at an impact velocity of 3.5 m/s. All tested suspension designs would pass this requirement, although the lower level of acceleration for the RAT suspensions would suggest a lower probability or severity of injury, particularly for repetitive brain injuries. The test data at 4.5 m/s is above the required test velocity of the conventional hardhat, resulting in damage to the helmet during testing and a "bottoming out" of the headform against the helmet shell, resulting in a spike in acceleration at high displacement. Similarly, the T50 RAT suspension bottomed out at 4.5 m/s, whereas the T52 RAT suspension did not.

Figure 23A:
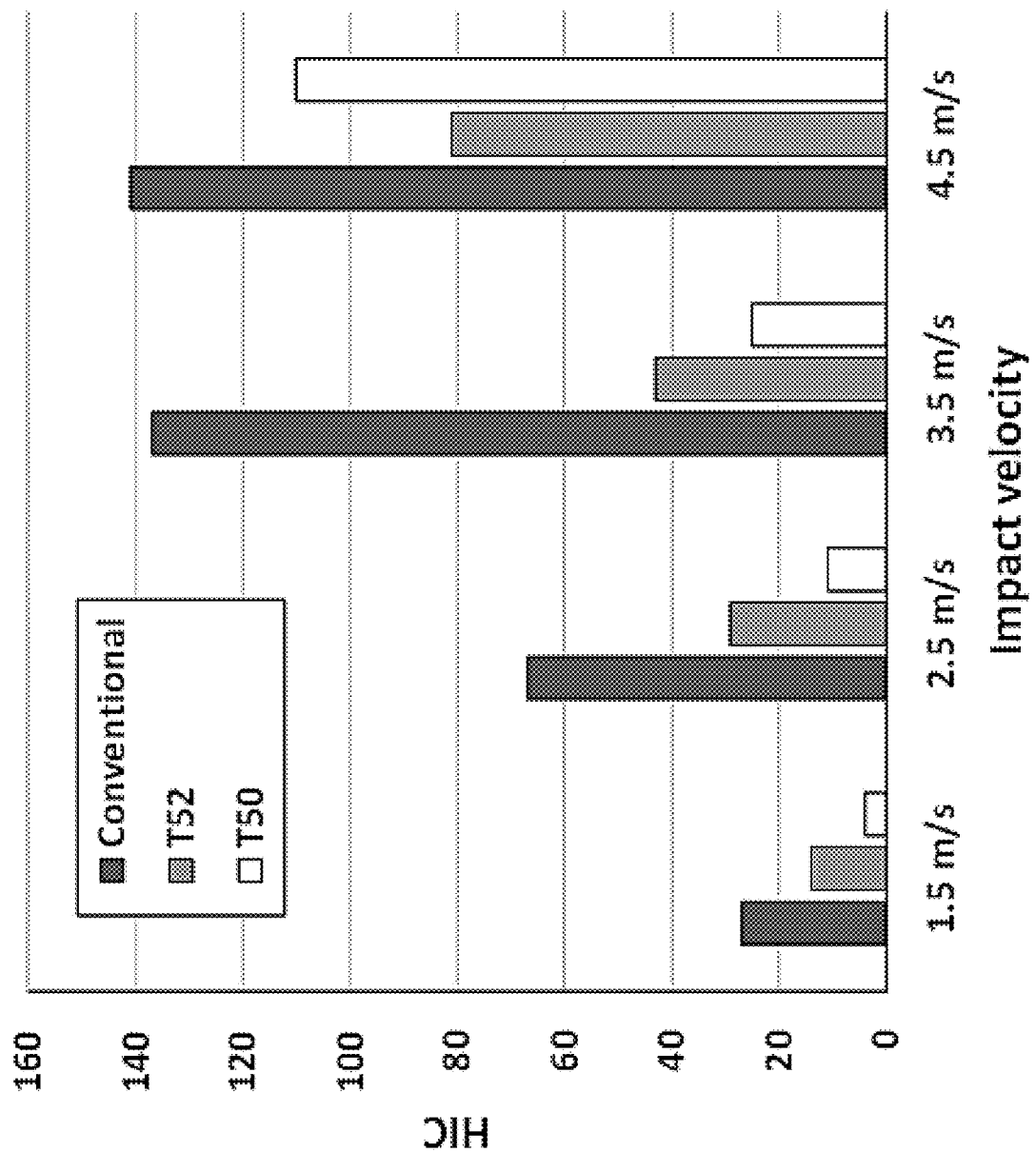
FIGS. 23(a)-23(c) are bar graphs showing head impact metrics for the conventional, T52 RAT, and T50 RAT suspensions.
Figure 23B:
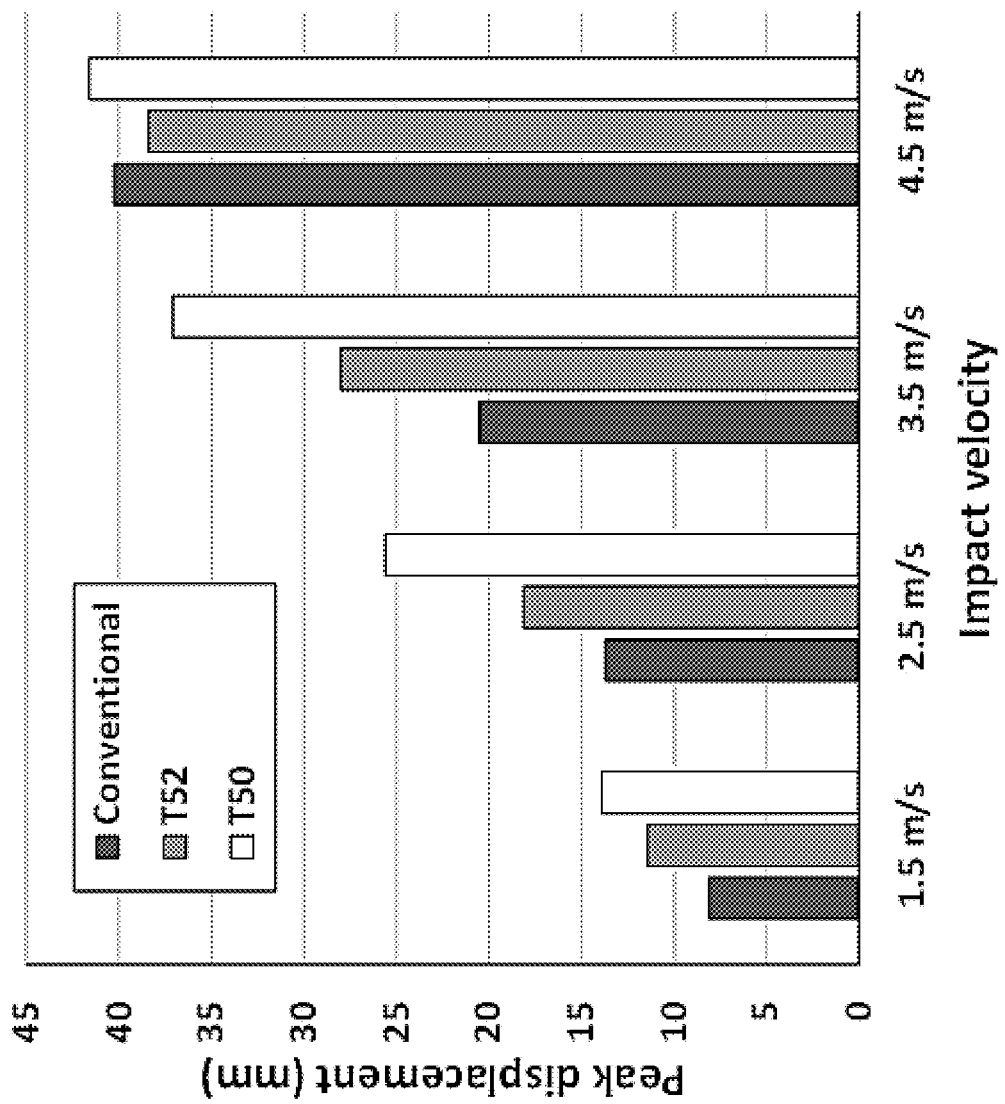
Figure 23C:
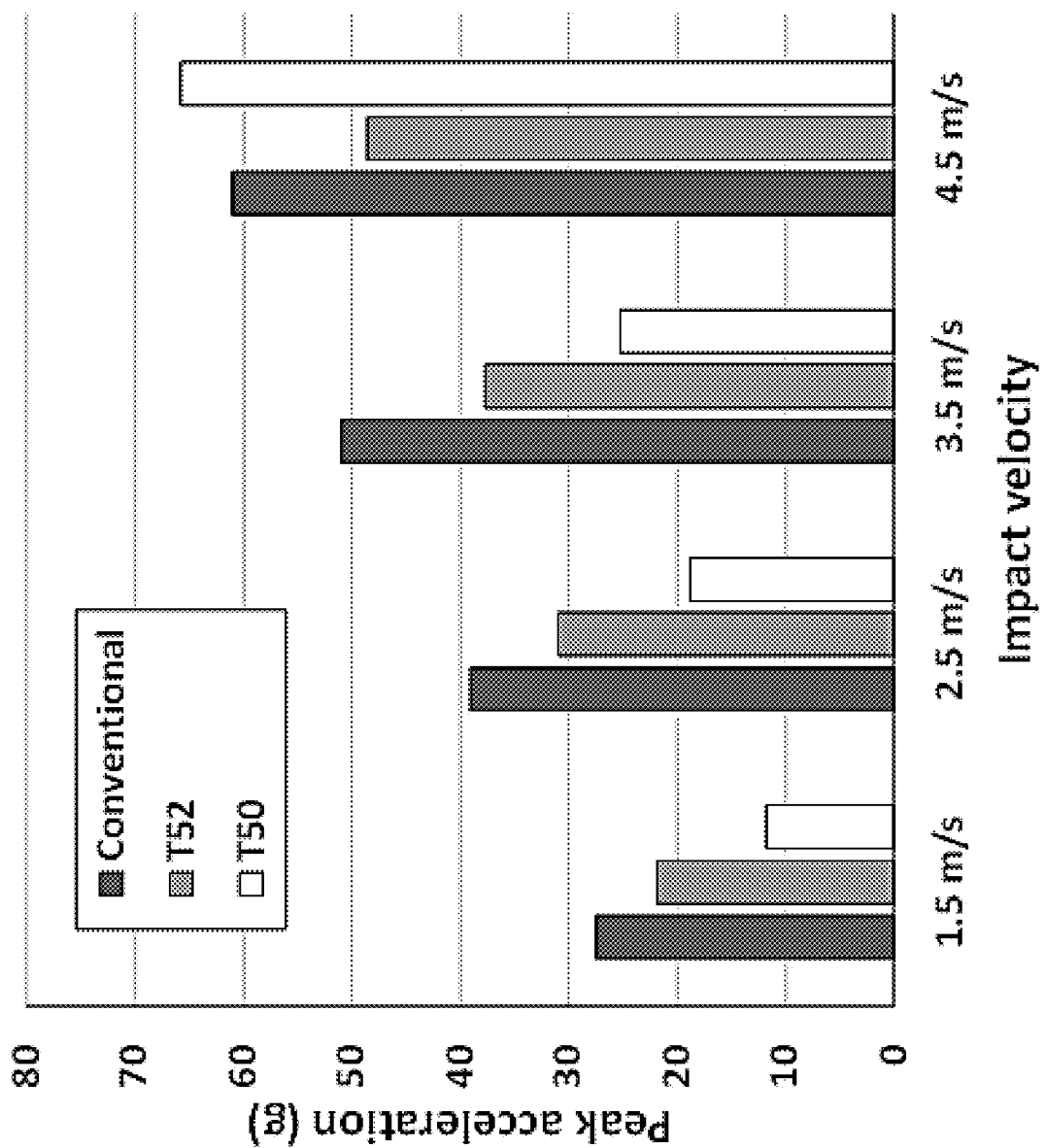

Table 1 and FIGS. 23(a)-23(c) summarize peak acceleration, peak displacement, and HIC metrics. FIGS. 23(a)-23(c) show head impact metrics for the conventional, T52 RAT, and T50 RAT suspensions. FIG. 23(a) shows peak acceleration, FIG. 23(b) shows peak displacement, and FIG. 23(c) shows HIC values. Overall, the RAT suspensions show lower peak acceleration, lower HIC, and higher displacements. The conventional suspension is generally "stiffer" than the RAT suspension designs, with the more "compliant" RAT suspensions leading to reduced loads on the headform.

The steady acceleration values for the RAT suspensions are characteristic of the desired ideal response. Two other features of the RAT response are non-ideal, and can be improved through further design improvements. First, FIGS. 22(a)-22(d) show that the RAT suspensions require around 5-10 mm of displacement to reach full loading, whereas ideal response would result in instantaneous production of force immediately upon impact. This delay in loading is likely due, in part, to the suspension not being in perfect contact with the headform prior to impact, requiring initial displacement to force the suspension into close and conformal contact with the headform. Improvements in fit, such as through the use of an inner shell design as shown in FIGS. 10(a)-10(d), could reduce this delay in loading and improve performance. A second limitation of the RAT suspension response is that, ideally, peak displacement should be very similar at all velocities, which would minimize peak acceleration. In contrast, the RAT suspensions show increasing peak displacement with increasing impact velocity. These results suggest that the RATs would benefit from an even stronger rate sensitivity over the velocity range of 1.5-4.5 m/s. The rate sensitivity could be increased by changes in the STF formulation to increase the critical shear rate of transition, or changes to the RAT geometry. Examples of RAT geometry changes would include creating a larger gap distance between ribbons; arranging multiple RATs in series; or having a larger number of RATs oriented to produce less stroke per RAT.

TABLE 1

Impact testing results.

| | Nominal impact velocity | | | |
|---|---|---|---|---|
| | 1.5 m/s | 2.5 m/s | 3.5 m/s | 4.5 m/s |
| Conventional | | | | |
| Impact velocity (m/s) | 1.56 ± 0.09 | 2.50 ± 0.01 | 3.52 | 4.62 |
| Peak accel. (g) | 27.5 ± 1.0 | 39.1 ± 1.0 | 51.0 | 61.0 |
| Peak disp. (mm) | 8.1 ± 0.45 | 13.7 ± 0.08 | 20.5 | 40.3 |
| HIC | 27 | 67 | 137 | 141 |
| T52 | | | | |
| Impact velocity (m/s) | 1.68 ± 0.04 | 2.61 ± 0.11 | 3.55 ± 0.02 | 4.50 |
| Peak accel. (g) | 21.8 ± 1.5 | 31.0 ± 0.5 | 37.7 ± 2.5 | 48.6 |
| Peak disp. (mm) | 11.4 ± 0.3 | 18.1 ± 1.0 | 28.0 ± 1.1 | 38.4 |
| HIC | 14 | 29 | 43 | 81 |
| T50 | | | | |
| Impact velocity (m/s) | 1.49 ± 0.01 | 2.54 ± 0.11 | 3.55 ± 0.01 | 4.54 |
| Peak accel. (g) | 11.8 ± 0.3 | 18.8 ± 1.0 | 25.3 ± 1.3 | 65.8 |
| Peak disp. (mm) | 13.9 ± 0.3 | 25.6 ± 1.5 | 37.1 ± 1.5 | 41.6 |
| HIC | 4 | 11 | 25 | 110 |

The present test results are intended to convey the basic nature of the performance of a RAT suspension, but are not intended to be limiting. Further tuning of the RAT suspension design—including the arrangement of RATs; length, diameter, and number of RATs; material selections for the STF, tubing, and ribbons—would be expected to lead to further improvements in comfort and performance. Although the present example uses a construction hardhat subject to crown impact, we also expect that similar designs could be applied to helmets for military, first responders, and athletes; for sick, disabled, or elderly individuals with medical conditions that require extra injury protection; and for impacts from any direction and to control both translational and rotational accelerations on the head.

In yet another embodiment, the at least one RAT 104 is configured to resist both longitudinal extension and longitudinal compression, and when an impact to the helmet shell causes a translation of the helmet shell 102 relative to the head and the translation of the helmet shell 102 relative to the head generates longitudinal compression of the at least one RAT 104, the at least one RAT 104 absorbs impact energy and reduces the force transmitted to the head.

In one disclosed embodiment, the impact energy absorbing device is configured as a vehicular seat 300 comprising a frame 302; a seat surface 306 which receives an impact force and supports a person; and one or more rate activated tethers (RATs) 104 in contact with the frame 302 and the seat surface 306, the one or more RATs 104 being configured to absorb impact energy and reduce the force transmitted to the body 301 of the person sitting in the seat.

Figures 24A, 24B:
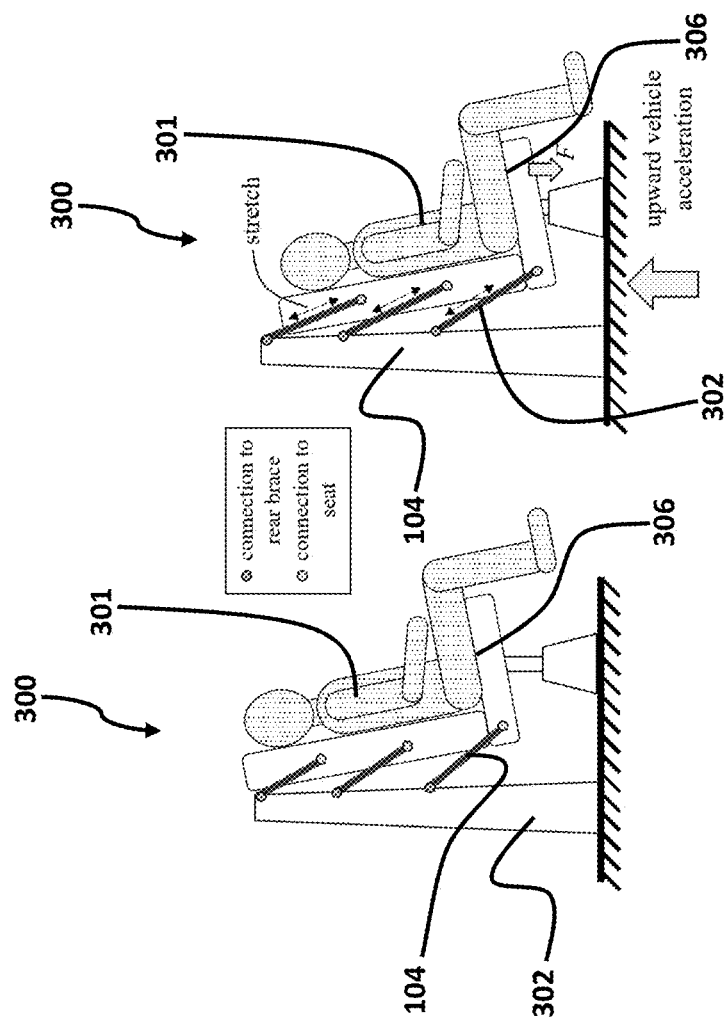
FIGS. 24(a)-24(b) are schematic views showing a suspension design in which RATs are configured to reduce forces transmitted to a seated occupant during sudden upward vehicle acceleration.

Accordingly, the principle of using RATs for limiting force transmission during sudden accelerative events can be applied to applications beyond helmets. FIGS. 24(a)-24(b) show how RATs can be used to minimize or reduce the forces transmitted to a seated occupant during a sudden upward vehicle acceleration. This type of event arises in many situations, including a ground vehicle that suffers an underbody blast, such as from a buried explosive; a rotorcraft that makes a hard ground landing; or an aircraft pilot during seat ejection. The RATs are configured so that they stretch during these accelerative events, consuming energy while minimizing force transmission to the occupant due their constant force behavior over long strokes. Similarly, RATs could be configured as a component in a seatbelt or body harness to safely decelerate a vehicle occupant in the event of a crash and minimize the likelihood of secondary collisions with the inside of the vehicle.

In one disclosed embodiment, the impact energy absorbing device is configured as a projectile 400 comprising: a projectile body 402 which receives an accelerative force; a critical component 401 mounted inside the projectile body 402; and one or more rate activated tethers (RATs) 104 coupled to the critical component 401 and the projectile body 402, the one or more rate activated tethers (RATs) 104 suspending the critical component 401 within the projectile body 402, the one or more RATs 104 being configured to absorb impact energy and reduce the force transmitted to the critical component 401 during accelerative launch or decelerative impact of the projectile. The critical component 401 may be electronic.

Figures 25A, 25B:
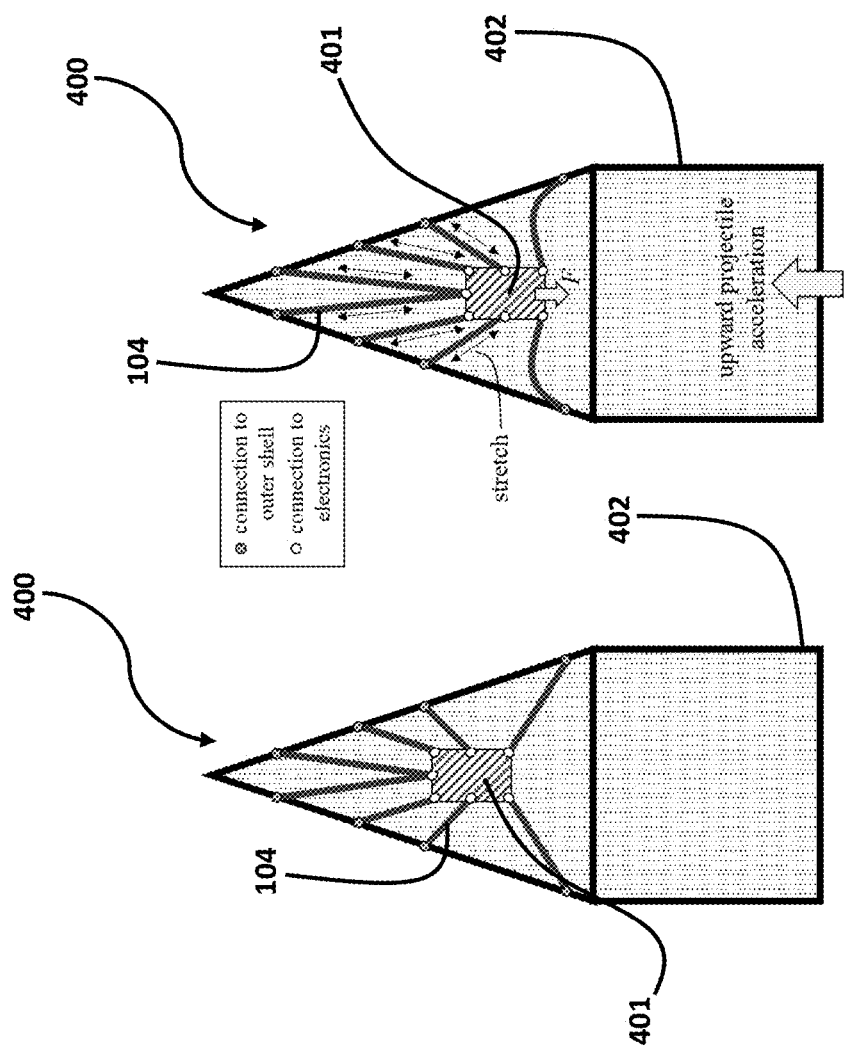
FIGS. 25(a)-25(b) are schematic views showing a suspension design in which RATS are configured to reduce forces transmitted to sensitive components during upward projectile launch.

Accordingly, RATs 104 can also be used for applications beyond human injury prevention. FIGS. 25(a)-25(b) show RATs 104 configured to reduce forces transmitted to sensitive components such as component 401 during upward launch of a projectile 400. FIGS. 25(a)-25(b) show a critical component 401 within the nose of a projectile 400. The projectile 400 could be a rocket, a missile, a munition, or a rifle round. For each of these applications, the projectile is typically subject to an initial, extremely high acceleration that quickly brings the projectile to launch velocity. This extreme acceleration can damage sensitive components inside of the projectile, such as component 401. In FIGS. 25(a)-25(b), the component 401 is suspended within the projectile body 402 by a series of RATs 104, configured to stretch and absorb energy during the rapid acceleration of the projectile body 402. The constant resistive force of the RATs 104 over long strokes consumes energy while minimizing the forces transmitted to the critical component 401, increasing the likelihood that the component 401 survives the launch process. Examples of critical components 401 that are electronic could include, but are not limited to, sensors, communication devices, computing devices, optical devices, or navigational devices.

The RATs can be used to protect any critical component within a container from impacts, shocks, and high accelerations imparted to the container. The projectile 402 is one example of such a container. Other examples of containers include, without limitation, coolers, crates, carrying cases, submarines, ships, aircraft, spacecraft, and land vehicles. Examples of critical or sensitive components that can be protected by RATs inside containers include, without limitation, optical devices, shock sensitive chemical/munition, chemical/nuclear reactor, propellant, or precious cargo such as artifacts, treasures, fossils, gems, interplanetary samples, eggs, tissue, and organs.

In a similar manner, RATs could be used to protect critical components and structures in civil structures at risk from seismic activity. For these applications, the RATs may be combined with springs and dashpots to achieve optimal dynamic behavior.

These examples show that RATs have broad applicability to the general problem of reducing transmitted forces to sensitive bodies during accelerative events.

Aspects concerning the embodiments herein are also included in the paper by D. J. Spinelli, T. A. Plaisted, and E. D. Wetzel, titled "Adaptive head impact protection via a rate-activated helmet suspension," which was published in Materials and Design on May 4, 2018, and which is incorporated by reference herein in its entirety.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:

1. An impact energy absorbing device comprising:
a surface which receives an impact force and is configured to be in proximity to a body; and
a suspension system connected to the surface for suspending the body and the surface relative to each other in at least one predetermined direction, wherein the suspension system comprises strapping connected to the surface, wherein the strapping is configured to be positioned at least in part in an internal space between the body and the surface during use, wherein the suspension system is configured to act between the body and the surface during use, and the strapping comprises at least one rate activated tether (RAT) which is configured to directly engage and contact the body to absorb impact energy and reduce the force transmitted to the body,
wherein the one or more RATs each comprise: (i) an elastic-deformable confinement member, (ii) one or more filaments placed inside the confinement member, (iii) end effectors connected to the confinement member and couple to the one or more filaments; and (iv) a shear-thickening fluid (STF) that fills the confinement member and wets the one or more filaments.

2. An impact energy absorbing helmet comprising:
a helmet shell; and
a suspension system connected to the helmet shell and configured for suspending the helmet shell on a person's head in at least one predetermined direction, wherein the suspension system comprises strapping connected to the helmet shell, wherein the strapping is configured to be positioned at least in part in a space between the head and the helmet shell during use, wherein the suspension system is configured to act between the head and the helmet shell during use, wherein the strapping comprises at least one rate activated tether (RAT) which is configured to directly engage and contact the person's head to absorb impact energy and reduce the force transmitted to the head,
wherein the helmet shell is configured to be supported on the head of the person by the suspension system such that there is a gap, having a size, between the helmet shell and the head, and
wherein impact to the helmet shell in at least the predetermined direction causes motion of the shell relative to the head, and generates extension of the RAT contacting the person's head to absorb impact energy and reduce the force transmitted to the head.

3. The device of claim 2, wherein the at least one RAT is configured to extend during an impact to at least one of: (i) the crown of the helmet, (ii) the rear of the helmet, (iii) the front of the helmet, and (iv) the side of the helmet.

4. The device of claim 2, wherein the strapping comprises a plurality of RATs, each of the plurality of RATs being configured to extend during an impact in a corresponding range of directions.

5. The device of claim 4, wherein each of the plurality of RATs has a first end and a second end, each of the plurality of RATs being attached to the helmet shell at both its first end and its second end such that its first and second ends are fixedly located relative to the helmet shell during use, each of the plurality of RATs having an intermediate portion located between its first end and its second end, each of the plurality of RATs configured to operatively engage and contact the person's head directly at its intermediate portion so as to extend in length during an impact in a corresponding range of directions to thereby absorb impact energy and reduce the force transmitted to the head.

6. The device of claim 5, wherein at least one of the plurality of RATs is positioned such that its intermediate portion operatively engages and contacts directly at least one of: (i) the crown region of the head, (ii) the frontal region of the head, (iii) the rear region of the head, (iv) the right side region of the head, and (v) the left side region of the head.

7. The device of claim 5, wherein at least one of the plurality of RATs is positioned such that one of its ends operatively engages and contacts directly at least one of: (i) the crown region of the head, (ii) the frontal region of the head, (iii) the rear region of the head, (iv) the right side region of the head, and (v) the left side region of the head.

8. The device of claim 2, wherein the helmet is configured to be retained on the head using a retention system comprising at least one additional RAT.

9. The device of claim 5, wherein the plurality of RATs are positioned in at least one set of planes selected from the group consisting of: (i) planes that rotate about a longitudinal anatomical axis through the approximate center of the head, (ii) planes that rotate about a horizontal anatomical axis through the approximate center of the head, (iii) planes that rotate about a sagittal anatomical axis through the approximate center of the head, (iv) planes that are parallel to the coronal anatomical plane, (v) planes that are parallel to the horizontal anatomical plane, and (vi) planes that are parallel to the sagittal anatomical plane.

10. The device of claim 5, wherein a first number of the plurality of RATs are positioned in planes that rotate about a sagittal anatomical axis through the approximate center of the head, and
wherein a second number of the plurality of RATs are positioned in planes that rotate about a horizontal anatomical axis through the approximate center of the head.

11. The device of claim 4, wherein each of the plurality of RATs has a first end and a second end, each of the plurality of RATs being attached to the helmet shell at its first end, the second ends of the plurality of RATs being attached together such that the plurality of RATs are positioned in planes that rotate about a longitudinal anatomical axis through the approximate center of the head, the first end of each of the plurality of RATs is fixedly located relative to the helmet shell during use, the second ends of the plurality of RATs being located over the crown region of the head, each of the plurality of RATs operatively engaging the person's head at least at its second end so as to extend in length at least during a downward impact to the crown of the helmet shell to thereby absorb impact energy and reduce the force transmitted to the head.

12. The device of claim 2, wherein the at least one RAT is configured to be in parallel and/or series with one or more of the following selected from the group consisting of: (i) a spring, (ii) an elastic strap, (iii) a damper, (iv) a foam pad, (v) a pneumatic element, and (vi) an elastomeric truss.

13. The device of claim 2, wherein the one or more RATs each comprise: (i) an elastic-deformable confinement member, (ii) one or more filaments placed inside the confinement member, (iii) end effectors connected to the confinement member and couple to the one or more filaments; and (iv) a shear-thickening fluid (STF) that fills the confinement member and wets the one or more filaments.

14. The device of claim 2, wherein the helmet shell has a rear portion, wherein the at least one RAT is connected to a strap configured to extend around the frontal region of the head, and wherein the strap passes through the helmet shell and is connected at either end to the ends of the RAT positioned to extend around the rear portion of the helmet shell.

15. The device of claim 2, wherein the at least one RAT is located remotely from the head, along the neck, shoulders, front of the torso, side of the torso, or back of the torso.

16. The device of claim 13, wherein strapping consists essentially of: the at least one RAT which is configured to directly engage and contact the person's head.

17. The device of claim 16 wherein the at least one RAT is configured to be located between the helmet shell and the person's head.

18. The device of claim 2, wherein the at least one RAT is configured to substantially conform to the shape of the person's head when worn.

19. The device of claim 18, wherein the at least one RAT is sufficiently flexible to snugly conform to the shape of a person's head when worn.

20. The device of claim 13, wherein no portion of the at least one RAT extends through the helmet shell.

21. The device of claim 13, wherein the at least one RAT attaches only to the interior surface of the helmet shell.

22. The device of claim 13, wherein, with elongation of the at least one RAT, the magnitude of the average resistance force increases as the rate of steady extension is increased.

23. The device of claim 22, wherein the at least one RAT is configured to resist steady extension of the at least one RAT with a steady force such that, during at least half of the elongation, the instantaneous resistance force is within 20% of the average resistance force experienced during the full elongation.

* * * * *